United States Patent
Miles

(10) Patent No.: US 7,907,319 B2
(45) Date of Patent: Mar. 15, 2011

(54) METHOD AND DEVICE FOR MODULATING LIGHT WITH OPTICAL COMPENSATION

(75) Inventor: Mark W. Miles, San Francisco, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 11/433,294

(22) Filed: May 12, 2006

(65) Prior Publication Data

US 2006/0274400 A1    Dec. 7, 2006

Related U.S. Application Data

(60) Continuation of application No. 11/056,571, filed on Feb. 11, 2005, now Pat. No. 7,379,227, which is a continuation of application No. 09/966,843, filed on Sep. 28, 2001, now Pat. No. 6,867,896, which is a division of application No. 09/056,975, filed on Apr. 8, 1998, now Pat. No. 6,674,562, which is a continuation-in-part of application No. 08/769,947, filed on Dec. 19, 1996, now abandoned, and a continuation-in-part of application No. 08/554,630, filed on Nov. 6, 1995, now abandoned.

(51) Int. Cl.
*G02B 26/00* (2006.01)

(52) U.S. Cl. ........ 359/224; 359/290; 359/291; 359/292; 359/295; 359/298; 345/85; 345/108; 348/770; 348/771

(58) Field of Classification Search .................. 359/223, 359/224, 290–292, 295, 298, 315, 318; 345/48, 345/84, 85, 90, 108; 348/750, 770, 771
See application file for complete search history.

(56) References Cited

U.S. PATENT DOCUMENTS

| | | | |
|---|---|---|---|
| 2,518,647 | A | 8/1950 | Teeple et al. |
| 2,534,846 | A | 12/1950 | Ambrose et al. |
| 2,677,714 | A | 5/1954 | Max |
| 3,247,392 | A | 4/1966 | Thelen |

(Continued)

FOREIGN PATENT DOCUMENTS

DE    34 02 746    8/1985

(Continued)

OTHER PUBLICATIONS

Office Action mailed Nov. 19, 2007 in U.S. Appl. No. 11/192,436.

(Continued)

*Primary Examiner* — Evelyn A. Lester
(74) *Attorney, Agent, or Firm* — Knobbe Martens Olson & Bear, LLP

(57) ABSTRACT

An interferometric modulator (Imod) cavity has a reflector and an induced absorber. A direct view reflective flat panel display may include an array of the modulators. Adjacent spacers of different thicknesses are fabricated on a substrate by a lift-off technique used to pattern the spacers which are deposited separately, each deposition providing a different thickness of spacer. Or a patterned photoresist may be used to allow for an etching process to selectively etch back the thickness of a spacer which was deposited in a single deposition. A full-color static graphical image may be formed of combined patterns of interferometric modulator cavities. Each cavity includes a reflector, and an induced absorber, the induced absorber including a spacer having a thickness that defines a color associated with the cavity.

45 Claims, 8 Drawing Sheets

U.S. PATENT DOCUMENTS

| | | |
|---|---|---|
| 3,439,973 A | 4/1969 | Paul et al. |
| 3,443,854 A | 5/1969 | Weiss |
| 3,448,334 A | 6/1969 | Frost |
| 3,653,741 A | 4/1972 | Marks |
| 3,656,836 A | 4/1972 | De Cremoux et al. |
| 3,679,313 A | 7/1972 | Rosenberg |
| 3,924,929 A | 12/1975 | Holmen |
| 3,955,190 A | 5/1976 | Teraishi |
| 3,955,880 A | 5/1976 | Lierke |
| 4,099,854 A | 7/1978 | Decker et al. |
| 4,154,219 A | 5/1979 | Gupta et al. |
| 4,200,472 A | 4/1980 | Chappell |
| 4,228,437 A | 10/1980 | Shelton |
| 4,287,449 A | 9/1981 | Takeda et al. |
| 4,375,312 A | 3/1983 | Tangonan |
| 4,377,324 A | 3/1983 | Durand et al. |
| 4,378,567 A | 3/1983 | Mir |
| 4,389,096 A | 6/1983 | Hori |
| 4,400,577 A | 8/1983 | Spear |
| 4,403,248 A | 9/1983 | te Velde |
| 4,441,789 A | 4/1984 | Pohlack |
| 4,441,791 A | 4/1984 | Hornbeck |
| 4,445,050 A | 4/1984 | Marks |
| 4,459,182 A | 7/1984 | te Velde |
| 4,497,974 A | 2/1985 | Deckman |
| 4,519,676 A | 5/1985 | te Velde |
| 4,531,126 A | 7/1985 | Sadones |
| 4,566,935 A | 1/1986 | Hornbeck |
| 4,596,992 A | 6/1986 | Hornbeck |
| 4,615,595 A | 10/1986 | Hornbeck |
| 4,633,031 A | 12/1986 | Todorof |
| 4,662,746 A | 5/1987 | Hornbeck |
| 4,663,083 A | 5/1987 | Marks |
| 4,681,403 A | 7/1987 | te Velde et al. |
| 4,688,068 A | 8/1987 | Chaffin et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,832,459 A | 5/1989 | Harper |
| 4,850,682 A | 7/1989 | Gerritsen |
| 4,859,060 A | 8/1989 | Katagiri |
| 4,863,224 A | 9/1989 | Afian |
| 4,918,577 A | 4/1990 | Furudate |
| 4,961,617 A | 10/1990 | Shahidi |
| 4,974,942 A | 12/1990 | Gross |
| 4,980,775 A | 12/1990 | Brody |
| 4,982,184 A | 1/1991 | Kirkwood |
| 4,985,312 A | 1/1991 | Furuya et al. |
| 5,022,745 A | 6/1991 | Zahowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,050,946 A | 9/1991 | Hathaway |
| 5,061,049 A | 10/1991 | Hornbeck |
| 5,075,796 A | 12/1991 | Schildkraut et al. |
| 5,078,479 A | 1/1992 | Vuilleumier |
| 5,110,370 A | 5/1992 | Vogeli et al. |
| 5,123,247 A | 6/1992 | Nelson |
| 5,124,834 A | 6/1992 | Cusano et al. |
| 5,142,414 A | 8/1992 | Koehler |
| 5,153,771 A | 10/1992 | Link et al. |
| 5,168,406 A | 12/1992 | Nelson |
| 5,192,946 A | 3/1993 | Thompson et al. |
| 5,226,099 A | 7/1993 | Mignardi et al. |
| 5,231,532 A | 7/1993 | Magel et al. |
| 5,233,385 A | 8/1993 | Sampsell |
| 5,233,459 A | 8/1993 | Bozler et al. |
| 5,261,970 A | 11/1993 | Landis et al. |
| 5,287,215 A | 2/1994 | Warde et al. |
| 5,291,314 A | 3/1994 | Agranat |
| 5,293,272 A | 3/1994 | Jannson et al. |
| 5,311,360 A | 5/1994 | Bloom et al. |
| 5,339,179 A | 8/1994 | Rudisil |
| 5,345,322 A | 9/1994 | Fergason et al. |
| 5,356,488 A | 10/1994 | Hezel |
| 5,365,283 A | 11/1994 | Doherty et al. |
| 5,381,253 A | 1/1995 | Sharp et al. |
| 5,398,125 A | 3/1995 | Willett |
| 5,398,170 A | 3/1995 | Lee |
| 5,401,983 A | 3/1995 | Jokerst et al. |
| 5,448,314 A | 9/1995 | Heimbuch et al. |
| 5,452,385 A | 9/1995 | Izumi |
| 5,457,900 A | 10/1995 | Roy |
| 5,459,610 A | 10/1995 | Bloom et al. |
| 5,467,417 A | 11/1995 | Nakamura |
| 5,481,385 A | 1/1996 | Zimmerman et al. |
| 5,497,172 A | 3/1996 | Doherty et al. |
| 5,500,761 A | 3/1996 | Goossen |
| 5,515,184 A | 5/1996 | Caulfield |
| 5,517,347 A | 5/1996 | Sampsell |
| 5,550,373 A | 8/1996 | Cole et al. |
| 5,555,160 A | 9/1996 | Tawara |
| 5,559,358 A | 9/1996 | Burns et al. |
| 5,569,565 A | 10/1996 | Kawakami et al. |
| 5,578,140 A | 11/1996 | Yogev et al. |
| 5,578,976 A | 11/1996 | Yao |
| 5,579,149 A | 11/1996 | Moret et al. |
| 5,592,332 A | 1/1997 | Nishio |
| 5,594,830 A | 1/1997 | Winston |
| 5,619,059 A | 4/1997 | Li et al. |
| 5,619,365 A | 4/1997 | Rhoads et al. |
| 5,619,366 A | 4/1997 | Rhoads et al. |
| 5,633,739 A | 5/1997 | Matsuyama |
| 5,636,052 A | 6/1997 | Arney et al. |
| 5,647,036 A | 7/1997 | Deacon et al. |
| 5,650,865 A | 7/1997 | Smith |
| 5,654,819 A | 8/1997 | Goossen |
| 5,659,410 A | 8/1997 | Koike |
| 5,671,314 A | 9/1997 | Gregory et al. |
| 5,671,994 A | 9/1997 | Tai |
| 5,673,128 A | 9/1997 | Ohta et al. |
| 5,703,667 A | 12/1997 | Ochiai |
| 5,703,710 A | 12/1997 | Brinkman et al. |
| 5,710,656 A | 1/1998 | Goossen et al. |
| 5,712,694 A | 1/1998 | Taira et al. |
| 5,720,827 A | 2/1998 | Simmons |
| 5,735,590 A | 4/1998 | Kashima |
| 5,739,945 A | 4/1998 | Tayebati |
| 5,745,281 A | 4/1998 | Yi |
| 5,754,260 A | 5/1998 | Ooi |
| 5,757,536 A | 5/1998 | Ricco et al. |
| 5,771,321 A | 6/1998 | Stern |
| 5,782,993 A | 7/1998 | Ponewash |
| 5,782,995 A | 7/1998 | Nanya et al. |
| 5,783,614 A | 7/1998 | Chen |
| 5,784,190 A | 7/1998 | Worley |
| 5,793,504 A | 8/1998 | Stoll |
| 5,805,117 A | 9/1998 | Mazurek |
| 5,808,708 A | 9/1998 | Oyama et al. |
| 5,810,464 A | 9/1998 | Ishikawa |
| 5,815,229 A | 9/1998 | Shapiro et al. |
| 5,818,095 A | 10/1998 | Sampsell |
| 5,825,528 A | 10/1998 | Goossen |
| 5,835,255 A | 11/1998 | Miles |
| 5,835,256 A | 11/1998 | Huibers |
| 5,853,310 A | 12/1998 | Nishimura |
| 5,854,872 A | 12/1998 | Tai |
| 5,868,480 A | 2/1999 | Zeinali |
| 5,877,874 A | 3/1999 | Rosenberg |
| 5,883,684 A | 3/1999 | Milikan et al. |
| 5,886,688 A | 3/1999 | Fifield |
| 5,892,598 A | 4/1999 | Asakawa |
| 5,913,594 A | 6/1999 | Iimura |
| 5,914,803 A | 6/1999 | Hwang et al. |
| 5,914,804 A | 6/1999 | Goossen |
| 5,920,421 A | 7/1999 | Choi |
| 5,933,183 A | 8/1999 | Enomoto |
| 5,943,158 A | 8/1999 | Ford et al. |
| 5,956,106 A | 9/1999 | Petersen |
| 5,959,763 A | 9/1999 | Bozler et al. |
| 5,961,198 A | 10/1999 | Hira |
| 5,982,540 A | 11/1999 | Koike |
| 5,986,796 A | 11/1999 | Miles |
| 5,991,073 A | 11/1999 | Woodgate et al. |
| 5,999,239 A | 12/1999 | Larson |
| 6,002,829 A | 12/1999 | Winston |

| | | | | | | |
|---|---|---|---|---|---|---|
| 6,008,449 | A | 12/1999 | Cole | 7,561,323 B2 | 7/2009 | Gally |
| 6,014,192 | A | 1/2000 | Lehureau | 7,564,612 B2 | 7/2009 | Chui |
| 6,028,690 | A | 2/2000 | Carter et al. | 7,603,001 B2 | 10/2009 | Wang |
| 6,031,653 | A | 2/2000 | Wang | 7,605,969 B2 | 10/2009 | Miles |
| 6,038,056 | A | 3/2000 | Florence et al. | 7,630,123 B2 | 12/2009 | Kothari |
| 6,040,937 | A | 3/2000 | Miles | 7,706,050 B2 | 4/2010 | Sampsell |
| 6,046,840 | A | 4/2000 | Huibers | 7,710,632 B2 | 5/2010 | Cummings |
| 6,048,071 | A | 4/2000 | Sawayama | 7,710,636 B2 | 5/2010 | Chui |
| 6,055,090 | A * | 4/2000 | Miles ............................ 359/291 | 7,733,439 B2 | 6/2010 | Sampsell |
| 6,068,382 | A | 5/2000 | Fukui | 7,750,886 B2 | 7/2010 | Sampsell |
| 6,072,620 | A | 6/2000 | Shiono | 7,766,498 B2 | 8/2010 | Sampsell |
| 6,073,034 | A | 6/2000 | Jacobsen | 7,777,954 B2 | 8/2010 | Gruhlke |
| 6,088,102 | A | 7/2000 | Manhart | 2001/0019479 A1 | 9/2001 | Nakabayashi |
| 6,091,469 | A | 7/2000 | Naito | 2001/0022636 A1 | 9/2001 | Yang et al. |
| 6,099,134 | A | 8/2000 | Taniguchi | 2001/0030861 A1 | 10/2001 | Oda |
| 6,123,431 | A | 9/2000 | Teragaki | 2001/0049061 A1 | 12/2001 | Nakagaki et al. |
| 6,128,077 | A | 10/2000 | Jovin | 2002/0015215 A1 | 2/2002 | Miles |
| 6,151,089 | A | 11/2000 | Yang et al. | 2002/0075555 A1 | 6/2002 | Miles |
| 6,195,196 | B1 | 2/2001 | Kimura et al. | 2002/0080465 A1 | 6/2002 | Han |
| 6,196,691 | B1 | 3/2001 | Ochiai | 2002/0126364 A1 | 9/2002 | Miles |
| 6,232,937 | B1 | 5/2001 | Jacobsen | 2003/0083429 A1 | 5/2003 | Smith |
| 6,243,149 | B1 | 6/2001 | Swanson et al. | 2003/0123245 A1 | 7/2003 | Parker |
| 6,259,082 | B1 | 7/2001 | Fujimoto et al. | 2003/0151821 A1 | 8/2003 | Favalora |
| 6,259,854 | B1 | 7/2001 | Shinji et al. | 2003/0161040 A1 | 8/2003 | Ishii |
| 6,273,577 | B1 | 8/2001 | Goto | 2003/0210363 A1 | 11/2003 | Yasukawa |
| 6,282,010 | B1 | 8/2001 | Sulzbach et al. | 2004/0051929 A1 | 3/2004 | Sampsell et al. |
| 6,285,424 | B1 | 9/2001 | Yoshida | 2004/0100594 A1 | 5/2004 | Huibers |
| 6,322,901 | B1 | 11/2001 | Bawendi | 2004/0175577 A1 | 9/2004 | Lin et al. |
| 6,342,970 | B1 | 1/2002 | Sperger et al. | 2004/0233503 A1 | 11/2004 | Kimura |
| 6,356,378 | B1 | 3/2002 | Huibers | 2005/0002082 A1 | 1/2005 | Miles |
| 6,381,022 | B1 | 4/2002 | Zavracky et al. | 2005/0195468 A1 | 9/2005 | Sampsell |
| 6,447,126 | B1 | 9/2002 | Hornbeck | 2005/0212738 A1 | 9/2005 | Gally |
| 6,504,589 | B1 | 1/2003 | Kashima | 2005/0253820 A1 | 11/2005 | Horiuchi |
| 6,520,643 | B1 | 2/2003 | Holman et al. | 2005/0286113 A1 | 12/2005 | Miles |
| 6,522,794 | B1 | 2/2003 | Bischel et al. | 2006/0028708 A1 | 2/2006 | Miles |
| 6,574,033 | B1 | 6/2003 | Chui | 2006/0066511 A1 | 3/2006 | Chui |
| 6,597,490 | B2 | 7/2003 | Tayebati | 2006/0066541 A1 | 3/2006 | Gally |
| 6,603,520 | B2 | 8/2003 | Umemoto | 2006/0066586 A1 | 3/2006 | Gally |
| 6,624,944 | B1 | 9/2003 | Wallace et al. | 2006/0066783 A1 | 3/2006 | Sampsell |
| 6,631,998 | B2 | 10/2003 | Egawa et al. | 2006/0066935 A1 | 3/2006 | Cummings et al. |
| 6,636,322 | B1 | 10/2003 | Terashita | 2006/0067600 A1 | 3/2006 | Gally |
| 6,650,455 | B2 | 11/2003 | Miles | 2006/0067633 A1 | 3/2006 | Gally |
| 6,674,562 | B1 | 1/2004 | Miles | 2006/0077123 A1 | 4/2006 | Gally |
| 6,680,792 | B2 | 1/2004 | Miles | 2006/0077124 A1 | 4/2006 | Gally et al. |
| 6,742,907 | B2 | 6/2004 | Funamoto et al. | 2006/0077127 A1 | 4/2006 | Sampsell |
| 6,778,746 | B2 | 8/2004 | Charlton | 2006/0077149 A1 | 4/2006 | Gally |
| 6,794,119 | B2 | 9/2004 | Miles | 2006/0077153 A1 | 4/2006 | Cummings et al. |
| 6,841,787 | B2 | 1/2005 | Almogy | 2006/0077154 A1 | 4/2006 | Gally |
| 6,867,896 | B2 | 3/2005 | Miles | 2006/0077512 A1 | 4/2006 | Cummings |
| 6,879,354 | B1 | 4/2005 | Sawayama | 2006/0077514 A1 | 4/2006 | Sampsell |
| 6,897,855 | B1 | 5/2005 | Matthies | 2006/0077522 A1 | 4/2006 | Kothari |
| 6,912,022 | B2 | 6/2005 | Lin et al. | 2006/0091824 A1 | 5/2006 | Pate |
| 6,958,847 | B2 | 10/2005 | Lin | 2006/0132383 A1 | 6/2006 | Gally |
| 6,967,779 | B2 | 11/2005 | Fadel et al. | 2006/0250337 A1 | 11/2006 | Miles |
| 6,999,236 | B2 | 2/2006 | Lin et al. | 2006/0262279 A1 | 11/2006 | Miles |
| 7,002,726 | B2 | 2/2006 | Patel | 2007/0132843 A1 | 6/2007 | Miles |
| 7,009,754 | B2 | 3/2006 | Huibers | 2007/0196040 A1 | 8/2007 | Wang |
| 7,042,643 | B2 | 5/2006 | Miles | 2007/0247704 A1 | 10/2007 | Mignard |
| 7,110,158 | B2 | 9/2006 | Miles | 2007/0253054 A1 | 11/2007 | Miles |
| 7,113,339 | B2 | 9/2006 | Taguchi et al. | 2007/0297191 A1 | 12/2007 | Sampsell |
| 7,123,216 | B1 | 10/2006 | Miles | 2008/0049450 A1 | 2/2008 | Sampsell |
| 7,126,738 | B2 | 10/2006 | Miles | 2008/0084600 A1 | 4/2008 | Bita et al. |
| 7,138,984 | B1 | 11/2006 | Miles | 2008/0084602 A1 | 4/2008 | Xu et al. |
| 7,142,347 | B2 | 11/2006 | Islam | 2008/0100900 A1 | 5/2008 | Chui |
| 7,161,728 | B2 | 1/2007 | Sampsell et al. | 2008/0112039 A1 | 5/2008 | Chui |
| 7,161,730 | B2 | 1/2007 | Floyd | 2008/0151347 A1 | 6/2008 | Chui |
| 7,187,489 | B2 | 3/2007 | Miles | 2008/0180956 A1 | 7/2008 | Gruhlke |
| 7,218,429 | B2 | 5/2007 | Batchko | 2008/0267572 A1 | 10/2008 | Sampsell |
| 7,256,922 | B2 | 8/2007 | Chui | 2009/0078316 A1 | 3/2009 | Khazeni |
| 7,304,784 | B2 | 12/2007 | Chui | 2009/0086301 A1 | 4/2009 | Gally |
| 7,342,705 | B2 | 3/2008 | Chui et al. | 2009/0097100 A1 | 4/2009 | Gally |
| 7,342,709 | B2 | 3/2008 | Lin | 2009/0126792 A1 | 5/2009 | Gruhlke |
| 7,355,780 | B2 | 4/2008 | Chui | 2009/0147535 A1 | 6/2009 | Mienko |
| 7,379,227 | B2 | 5/2008 | Miles | 2009/0168459 A1 | 7/2009 | Holman |
| 7,385,748 | B2 | 6/2008 | Miles | 2009/0219604 A1 | 9/2009 | Miles |
| 7,388,706 | B2 | 6/2008 | Miles | | | |
| 7,417,735 | B2 | 8/2008 | Cummings | | | |
| 7,463,421 | B2 | 12/2008 | Miles | DE | 196 22 748 | 12/1997 |
| 7,508,571 | B2 | 3/2009 | Gally | DE | 102 28 946 | 1/2004 |

FOREIGN PATENT DOCUMENTS

| | | |
|---|---|---|
| EP | 0 223 136 A | 5/1987 |
| EP | 0 278 038 | 8/1988 |
| EP | 0 539 099 | 4/1993 |
| EP | 0 590 511 | 4/1994 |
| EP | 0 621 500 | 10/1994 |
| EP | 0 667 548 | 8/1995 |
| EP | 0 667548 | 8/1995 |
| EP | 0 786 911 | 7/1997 |
| EP | 0 822 441 | 2/1998 |
| EP | 0 830 032 | 3/1998 |
| EP | 0 855 745 | 7/1998 |
| EP | 0 879 991 | 11/1998 |
| EP | 0 907 050 | 4/1999 |
| EP | 0 957 392 | 11/1999 |
| EP | 1 640 313 | 3/2006 |
| EP | 1 640 314 | 3/2006 |
| EP | 1 640 337 | 3/2006 |
| EP | 1 640 764 | 3/2006 |
| EP | 1 640 767 | 3/2006 |
| EP | 1 640 778 | 3/2006 |
| EP | 1 988 332 | 11/2008 |
| EP | 1 988 333 | 11/2008 |
| EP | 2 030 947 | 3/2009 |
| EP | 2 068 180 | 6/2009 |
| EP | 2 068 181 | 6/2009 |
| EP | 2 068 182 | 6/2009 |
| EP | 2 069 684 | 6/2009 |
| EP | 2 069 839 | 6/2009 |
| EP | 2 069 840 | 6/2009 |
| EP | 2 069 841 | 6/2009 |
| GB | 2 260 203 | 4/1993 |
| GB | 2 278 222 | 11/1994 |
| GB | 2 321 532 | 7/1998 |
| GB | 2 331 615 | 5/1999 |
| JP | 56-010976 | 2/1981 |
| JP | 56-010977 | 2/1981 |
| JP | 60 242408 | 12/1985 |
| JP | 62-009317 | 1/1987 |
| JP | 02 068513 | 3/1990 |
| JP | 02-151079 A | 6/1990 |
| JP | 04 081816 | 3/1992 |
| JP | 04-238321 A | 8/1992 |
| JP | 05 281479 | 10/1993 |
| JP | 06-209114 | 7/1994 |
| JP | 07-509327 | 10/1995 |
| JP | 08 018990 | 1/1996 |
| JP | 09 022012 | 1/1997 |
| JP | 09 160032 | 6/1997 |
| JP | 09 189869 | 7/1997 |
| JP | 09-189910 | 7/1997 |
| JP | 09-507920 | 8/1997 |
| JP | 09-260696 | 10/1997 |
| JP | 09 281917 | 10/1997 |
| JP | 09 311333 | 12/1997 |
| JP | 10 202948 | 4/1998 |
| JP | 11 174234 A | 7/1999 |
| JP | 11 211999 | 8/1999 |
| JP | 11 231321 | 8/1999 |
| JP | 11 232919 | 8/1999 |
| JP | 2001-021883 | 1/2001 |
| JP | 2001/343514 A | 12/2001 |
| WO | WO 94/06871 A1 | 3/1994 |
| WO | WO 95/01584 | 1/1995 |
| WO | WO 95/14256 | 5/1995 |
| WO | WO 95/14256 A1 | 5/1995 |
| WO | WO 95/15582 A1 | 6/1995 |
| WO | WO 95/30924 A | 11/1995 |
| WO | WO 96/08833 | 3/1996 |
| WO | WO 96/16348 | 5/1996 |
| WO | WO 97/01240 | 1/1997 |
| WO | WO 97/16756 | 5/1997 |
| WO | WO 97/17628 | 5/1997 |
| WO | WO 97/44707 A | 11/1997 |
| WO | WO 98/19201 | 5/1998 |
| WO | WO 98/32047 | 7/1998 |
| WO | WO 98/35182 | 8/1998 |
| WO | WO 99/04296 A | 1/1999 |
| WO | WO 2004/006003 | 1/2004 |
| WO | WO 2005/076051 | 8/2005 |
| WO | WO 2005/093488 | 10/2005 |
| WO | WO 2005/093490 | 10/2005 |
| WO | WO 2006/036440 | 4/2006 |
| WO | WO 2006/036451 | 4/2006 |
| WO | WO 2006/036495 | 4/2006 |
| WO | WO 2006/036519 | 4/2006 |
| WO | WO 2006/036540 | 4/2006 |
| WO | WO 2006/036564 | 4/2006 |
| WO | WO 2006/036588 | 4/2006 |
| WO | WO 2007/127046 | 11/2007 |
| WO | WO 2007/149474 | 12/2007 |
| WO | WO 2008/027275 | 3/2008 |
| WO | WO 2008/039229 | 4/2008 |
| WO | WO 2008/045200 | 4/2008 |
| WO | WO 2008/045207 | 4/2008 |
| WO | WO 2008/045218 | 4/2008 |
| WO | WO 2008/045222 | 4/2008 |
| WO | WO 2008/045224 | 4/2008 |
| WO | WO 2008/045310 | 4/2008 |
| WO | WO 2008/045311 | 4/2008 |
| WO | WO 2008/045312 | 4/2008 |
| WO | WO 2008/045362 | 4/2008 |
| WO | WO 2008/045363 | 4/2008 |
| WO | WO 2008/045364 | 4/2008 |
| WO | WO 2008/045462 | 4/2008 |
| WO | WO 2008/045463 | 4/2008 |
| WO | WO 2008/069877 | 6/2008 |
| WO | WO 2008/109620 | 9/2008 |
| WO | WO 2008/137299 | 11/2008 |
| WO | WO 2009/032525 | 3/2009 |
| WO | WO 2009/073555 | 6/2009 |
| WO | WO 2009/076075 | 6/2009 |

OTHER PUBLICATIONS

Request for Continued Examination mailed Oct. 4, 2007 in U.S. Appl. No. 11/192,436.
Notice of Allowance mailed Jul. 5, 2007 in U.S. Appl. No. 11/192,436.
Office Action mailed Feb. 27, 2007 in U.S. Appl. No. 11/192,436.
Amendment and Response to Office Action mailed Feb. 27, 2007 in U.S. Appl. No. 11/192,436.
Request for Continued Examination mailed Apr. 27, 2007 in U.S. Appl. No. 11/192,436.
Office Action mailed Jun. 27, 2006 in U.S. Appl. No. 11/192,436.
Amendment and Response to Office Action mailed Jun. 27, 2006 in U.S. Appl. No. 11/192,436.
Requirement for Restriction/Election mailed Mar. 17, 2006 in U.S. Appl. No. 11/192,436.
Response to Requirement for Restriction/Election mailed Mar. 17, 2006 in U.S. Appl. No. 11/192,436.
RCE and Response to Office Action mailed Sep. 11, 2007 in U.S. Appl. No. 11/432,724.
Office Action mailed Sep. 11, 2007 in U.S. Appl. No. 11/432,724.
Office Action mailed Apr. 13, 2007 in U.S. Appl. No. 11/432,724.
Amendment and Response to Office Action mailed Apr. 13, 2007 in U.S. Appl. No. 11/432,724.
Requirement for Restriction/Election mailed Jan. 4, 2007 in U.S. Appl. No. 11/432,724.
Response to Requirement for Restriction/Election mailed Jan. 4, 2007 in U.S. Appl. No. 11/432,724.
Aratani, et al., "Surface micromachined tuneable interferometer array", Sensors and Actuators A, 43 (1994), pp. 17-23.
Gally, "Wide-Gamut Color Reflective Displays Using iMOD Interference Technology," SID 04 Digest, pp. 654-657, 2004.
Miles, M.W., et al. "Digital Paper(TM) for Reflective Displays," Journal of the Society for Information Display, Society for Information Display, San Jose, US, vol. 11, No. 1, 2003, pp. 209-215.
Restriction Requirement in U.S. Appl. No. 11/390,996, mailed on Apr. 24, 2007.
Response to Restriction Requirement in U.S. Appl. No. 11/390,996, mailed on Apr. 24, 2007.
Office Action in U.S. Appl. No. 11/390,996, mailed on Aug. 9, 2007.
Amendment and Response to Office Action in U.S. Appl. No. 11/390,996, mailed on Aug. 9, 2007.
ISR and WO in US/PCT2005/005896 filed on Feb. 25, 2005.

IPER in US/PCT2005/005896 filed on Feb. 25, 2005.
ISR and WO in US/PCT2005/032020 filed on Aug. 9, 2005.
IPER in US/PCT2005/032020 filed on Aug. 9, 2005.
ISR and WO in US/PCT2005/033056 filed on Sep. 14, 2005.
IPER in US/PCT2005/033056 filed on Sep. 14, 2005.
ISR and WO dated Jun. 8, 2005 in International Patent Application No. PCT/US2005/002986 (International Publication No. WO 2006/076051).
Austrian Search Report in U.S. Appl. No. 11/036,965 dated Jul. 25, 2005.
Office Action in U.S. Appl. No. 11/036,965 dated Mar. 28, 2006.
Amendment in U.S. Appl. No. 11/036,965 dated Jun. 27, 2006.
Office Action in U.S. Appl. No. 11/036,965 dated Jan. 30, 2007.
Amendment in U.S. Appl. No. 11/036,965 dated Jun. 29, 2007.
Notice of Allowance in U.S. Appl. No. 11/036,965 dated Sep. 11, 2007.
Office Action in U.S. Appl. No. 12/034,499 dated Jul. 9, 2008.
Amendment in U.S. Appl. No. 12/034,499 dated Oct. 8, 2008.
Office Action in U.S. Appl. No. 12/034,499 dated Jan. 26, 2009.
RCE and Amendment in U.S. Appl. No. 12/034,499 dated Apr. 27, 2009.
Office Action in U.S. Appl. No. 12/014,657 dated Aug. 21, 2008.
Amendment in U.S. Appl. No. 12/014,657 dated Nov. 21, 2008.
Office Action in U.S. Appl. No. 12/014,657 dated Mar. 5, 2009.
Amendment in U.S. Appl. No. 12/014,657 dated Jun. 5, 2009.
Official Communication in Taiwan App. No. 09410330 dated Aug. 16, 2006.
Official Communication in Chinese App. No. 200580003812 dated Mar. 7, 2008.
Official Communication in Russian App. No. 2006131568/28(o34325) dated Feb. 17, 2009.
Austrian Search Report in U.S. Appl. No. 11/140,561 dated Jul. 12, 2005.
Response to Office Action dated Mar. 19, 2008 in U.S. Appl. No. 11/192,436.
Notice of Allowance mailed Jul. 25, 2008 in U.S. Appl. No. 11/192,436.
Office Action dated Dec. 13, 2007 in U.S. Appl. No. 11/742,271.
Amendment and Response dated Mar. 13, 2008 in U.S. Appl. No. 11/742,271.
Office Action dated Jul. 28, 2008 in U.S. Appl. No. 11/742,271.
Amendment and Response dated Sep. 29, 2008 in U.S. Appl. No. 11/742,271.
Office Action dated Oct. 21, 2008 in U.S. Appl. No. 11/742,271.
Amendment and Response dated Jan. 21, 2009 in U.S. Appl. No. 11/742,271.
Notice of Allowance dated Apr. 23, 2009 in U.S. Appl. No. 11/742,271.
Office Action dated Dec. 21, 2007 in U.S. Appl. No. 11/432,724.
Response to Office Action dated Apr. 21, 2008 in U.S. Appl. No. 11/432,724.
Office Action dated Jul. 28, 2008 in U.S. Appl. No. 11/432,724.
Amendment and Response dated Jan. 27, 2009 in U.S. Appl. No. 11/432,724.
Office Action dated Mar. 3, 2009 in U.S. Appl. No. 11/432,724.
Notice of Allowance dated Jun. 4, 2008 in U.S. Appl. No. 11/390,996.
Notice of Allowance dated Jul. 11, 2008 in U.S. Appl. No. 11/390,996.
Rce dated Sep. 4, 2008 in U.S. Appl. No. 11/390,996.
Notice of Allowance dated Sep. 24, 2008 in U.S. Appl. No. 11/390,996.
Abilieah A., "Optical Tiled AMLCD for very large display applications," SID International Symposium Digest of Papers, Boston, pp. 945-949, May 17, 1992.
Aratani et al.,"Surface Micromachined Tuneable Interferometer Array," Sensors and Actuators A, vol. A43, No. 1/3, pp. 17-23, May 1994.
Conner, "Hybrid Color Display Using Optical Interference Filter Array," SID Digest, pp. 577-580, 1993.
Fan et al., "Channel Drop Filters in Photonic Crystals," Optics Express, vol. 3, No. 1, pp. 4-11, 1998.

Jerman et al., "A Miniature Fabry-Perot Interferometer Fabricated Using Silicon Micromaching Techniques," IEEE Electron Devices Society, pp. 372-375, 1988.
Jerman et al., "A Miniature Fabry-Perot Interferometer with a Corrugated Silicon Diaphragm Support," pp. 140-144, 1990.
Magel, "Integrated Optic Devices Using Micromachined Metal Membranes," SPIE vol. 2686, 0-8194-2060-3, pp. 54-63, 1996.
Mehregany et al., "MEMS Applications in Optical Systems," IEEE/LEOS 1996 Summer Topical Meetings, pp. 75-76, Aug. 5-9, 1996.
Miles, et al., "Digital Paper for reflective displays," Journal of the Society for Information Display, San Jose, CA, vol. 11, No. 1, pp. 209-215, 2003.
Miles, Interferometric Modulation: MOEMS as an enabling technology for high-performance reflective displays, Proceedings of the SPIE, vol. 4985:28, pp. 131-139, Jan. 2003.
Miles, Mark, W., "A New Reflective FPD Technology Using Interferometric Modulation," The Proceedings of the Society for Information Display, pp. 379-382, May 11-16, 1997.
Miles, MW, "A MEMS Based Interferometric Modulator (IMOD) for Display Applications" Proceedings of Sensors Expo, Oct. 21, 1997 © 1997 Helmer's Publishing, Inc. pp. 281-284, Oct. 1997.
Obi et al., Fabrication of Optical MEMS in SOL-GEL Materials; IEEE/LEOS International Conference on Optical MEMS, pp. 39-40, Aug. 2002.
Oliner, "Radiating Elements and Mutual Coupling," Microwave Scanning Antennas, vol. 2, 131-157 and pp. 190-194, 1966.
Petschick et.al., "Fabry-Perot-Interferometer," available at http://pl.physik.tu-berlin.de/groups/pg279/protokolless02/04_fpi.pdf, pp. 50-60, May 14, 2002.
Raley et al., "A Fabry-Perot Microinterferometer for Visible Wavelengths," IEEE Solid-State Sensor and Actuator Workshop, Hilton Head, SC, pp. 170-173, 1992.
Sperger et al., "High Performance Patterned All-Dielectric Interference Colour Filter for Display Applications," SID Digest, pp. 81-83, 1994.
Walker et al., "Electron-beam-tunable Interference Filter Spatial Light Modulator," Optics Letters vol. 13, No. 5, pp. 345-347, May 1988.
Wu et al. "Design of a Reflective Color LCD Using Optical Interference Reflectors," ASIA Display '95, pp. 929-931, Oct. 1995.
Zhou et al., "Waveguide Panel Display Using Electromechanical Spatial Modulators" SID Digest, vol. XXIX, 1998.
Austrian Search Report for U.S. Appl. No. 11/041,020 dated May 9, 2005.
Austrian Search Report for U.S. Appl. No. 11/051,258 dated May 13, 2005.
Austrian Search Report for U.S. Appl. No. 11/040,824 dated Jul. 14, 2005.
Austrian Search Report for U.S. Appl. No. 11/077,974 dated Jul. 14, 2005.
Austrian Search Report for U.S. Appl. No. 11/036,966 dated Jul. 28, 2005.
Austrian Search Report for U.S. Appl. No. 11/064,143 dated Aug. 12, 2005.
Extended European Search Report in European App. No. 05255711.3 (Publication No. EP 1640778) dated Jan. 25, 2006.
Extended European Search Report in European App. No. 05255657.8 (Publication No. EP 1640767) dated Dec. 7, 2005.
Extended European Search Report in European App. No. 05255647.9 (Publication No. EP 1640314) dated Mar. 12, 2008.
Extended Search Report in European App. No. 05255646.1 (Publication No. EP 1 640 313) dated Feb. 6, 2007.
Extended European Search Report in App. No. 05255638.8 (Publication No. EP 1640764) dated May 4, 2006.
European Search Report in App. No. 08153436.4 (Publication No. EP 1988332) dated Oct. 8, 2008.
European Search Report in App. No. 08153770.6 (Publication No. EP 1988333) dated Sep. 29, 2008.
Extended European Search Report in App. No. 08153441.4 (Publication No. EP 2030947) dated Mar. 25, 2009.
Extended Search Report in European App. No. 08153690.6 (Publication No. EP 2068181 ) dated Mar. 5, 2009.

Extended European Search Report in App. No. 08153691.4 (Publication No. EP 2068182) dated Mar. 25, 2009.
Extended Search Report in European App. No. 08153686.4 (Publication No. EP 2068180) dated Apr. 17, 2009.
International Search Report and Written Opinion in PCT/US2005/006629 (International Publication No. WO 2005/093490) dated Jun. 6, 2005.
International Search Report and Written Opinion in PCT/US2005/005896 (International Publication No. WO 2005/093488) dated Jun. 7, 2005.
International Search Report and Written Opinion in PCT/US2005/032633 (International Publication No. WO 2006/036540) dated Feb. 6, 2006.
International Search Report and Written Opinion in PCT/US2005/032886 (International Publication No. WO 2006/036564) dated Mar. 30, 2006.
International Search Report and Written Opinion in PCT/US2005/032020 (International Application No. WO 2006/036495) dated Dec. 30, 2005.
International Search Report and Written Opinion in PCT/US2005/031238 (Publication No. WO 2006 036451) dated Dec. 14, 2005.
International Search Report and Written Opinion in PCT/US2005/033056 (International Publication No. WO 2006/036588) dated Jan. 30, 2006.
International Search Report and Written Opinion in PCT/US2005/032335 (International Publication No. WO 2006/036519) dated Dec. 30, 2005.
International Search Report and Written Opinion in PCT/US2005/030968 (International Publication No. WO 2006/036440) dated Jan. 10, 2006.
International Search Report and Written Opinion in PCT/US2008/061046 (International Publication No. WO 2008/137299) dated Oct. 01, 2008.
International Search Report and Written Opinion in PCT/US2007/018639 (International Publication No. WO 2008/027275) dated Mar. 20, 2008.
International Search Report and Written Opinion in PCT/US2007/020969 (International Publication No. WO 2008/045222) dated Mar. 5, 2008.
International Search Report and Written Opinion in PCT/US2007/020911 (International Publication No. WO 2008/045218) dated Mar. 18, 2008.
Partial International Search Report in PCT/US2008/086875 dated Apr. 16, 2009.
International Search Report and Written Opinion in PCT/US2007/021459 (International Publication No. WO 2008/045363) dated May 14, 2008.
International Search Report and Written Opinion in PCT/US2007/021460 (International Publication No. WO 2008/045364) dated May 14, 2008.
International Search Report and Written Opinion in PCT/US2007/021375 (International Publication No. WO 2008/045310) dated May 14, 2008.
International Search Report and Written Opinion in PCT/US2007/021458 (International Publication No. WO 2008/045362) dated May 14, 2008.
International Search Report and Written Opinion in PCT/US2007/020680 (International Publication No. WO 2008/045200) dated Jul. 1, 2008.
International Search Report and Written Opinion in PCT/US2007/020736 (International Publication No. WO 2008/045207) dated Jul. 14, 2008.
International Search Report and Written Opinion in PCT/US2007/021378 (International Publication No. WO 2008/045312) dated Mar. 5, 2008.
International Search Report and Written Opinion in PCT/US2007/021376 (International Publication No. WO 2008/045311) dated Jun. 18, 2008.
International Search Report and Written Opinion in PCT/US2007/020999 (International Publication No. WO 2008/045224) dated Apr. 8, 2008.
International Search Report and Written Opinion in PCT/US2007/021623 (International Publication No. WO 2008/045463) dated Oct. 22, 2008.
International Search Report and Written Opinion in PCT/US2007/021622 (International Publication No. WO 2008/045462) dated Oct. 22, 2008.
International Search Report and Written Opinion in PCT/US2008/073610 (International Pub. No. WO 2009/032525) dated Apr. 6, 2009.
International Search Report and Written Opinion in PCT/US2008/085010 (International Pub. No. WO 2009/073555 ) dated Mar. 4, 2009.
Written Opinion for International Application No. PCT/US2007/04277 (International Publication No. WO 2008/039229) dated Apr. 3, 2008.
International Search Report and Written Opinion in PCT/US2007/008790 (International Publication No. WO 2007/127046) dated Nov. 2, 2007.
International Search Report and Written Opinion in PCT/US2007/014358 (International Publication No. WO 2007/149474) dated Dec. 13, 2007.
International Search Report and Written Opinion in PCT/US2007/022736 (International Publication No. WO 2008/069877) dated Aug. 14, 2008.
International Search Report and Written Opinion in PCT/US2008/085026 (International Publication No. WO 2009/076075) dated Apr. 20, 2009.
International Search Report and Written Opinion in PCT/US2009/033698 dated May 29, 2009.
Partial International Search Report in PCT/US2009/033597 dated May 19, 2009.
U.S. Appl. No. 08/554,630 filed on Nov. 6, 1995.
Office Action in U.S. Appl. No. 08/554,630 dated Aug. 1, 1996.
Response to Office Action in U.S. Appl. No. 08/554,630 dated Oct. 3, 1996.
Office Action in U.S. Appl. No. 08/554,630 dated Nov. 29, 1996.
Response to Office Action in U.S. Appl. No. 08/554,630 dated May 29, 1997.
Notice of Appeal in U.S. Appl. No. 08/554,630 dated May 29, 1997.
Advisory Action in U.S. Appl. No. 08/554,630 dated Jun. 10, 1997.
Request for CPA in U.S. Appl. No. 08/554,630 dated Dec. 1, 1997.
Office Action in U.S. Appl. No. 08/554,630 dated Mar. 31, 1998.
Response to Office Action in U.S. Appl. No. 08/554,630 dated Jun. 30, 1998.
Notice of Allowance in U.S. Appl. No. 08/554,630 dated Sep. 3, 1998.
Notice of Abandonment in U.S. Appl. No. 08/554,630 dated Feb. 5, 1999.
"Glass Polarizing and Interference Filters," American Institute Of Physics Handbook, pp. 6-172-6-178, 1982.
Giles et al., "Silicon MEMS Optical Switch Attenuator and Its Use in Lightwave Subsystems", IEEE Journal of Selected Topics in Quantum Electronics, vol. 5. No. 1, pp. 18-25, Jan./Feb. 1999.
Little et al., "Vertically Coupled Microring Rosonator Channel Dropping Filter", IEEE Photonics Technology Letters, vol. 11, No. 2, pp. 215-217, 1999.
Office Action in U.S. Appl. No. 12/034,499 dated Jul. 16, 2009.
Interview Request in U.S. Appl. No. 12/034,499 dated Oct. 22, 2009.
Examiner Interview Summary in U.S. Appl. No. 12/034,499 dated Oct. 29, 2009.
Amendment, Applicant Summary of Interview in U.S. Appl. No. 12/034,499 dated Dec. 16, 2009.
Office Action in U.S. Appl. No. 12/034,499 dated Apr. 1, 2010.
Office Action in U.S. Appl. No. 12/014,657 dated Oct. 15, 2009.
Amendment in U.S. Appl. No. 12/014,657 dated Feb. 16, 2010.
Office Action in European App. No. 05 712 433 dated Mar. 9, 2010.
Office Action in Japanese Application No. JP 2006-552191, dated Mar. 30, 2010.
Office Action in Japanese Application No. JP 2006-552191, dated Sep. 8, 2009.
Office Action in Mexican Application No. PA/a/2006/008719, dated Aug. 12, 2008.

Office Action in Vietnamese Application No. 1-2006-01453, dated Dec. 16, 2009.
Office Action in U.S. Appl. No. 12/360,005 mailed Apr. 22, 2010.
Akasaka, "Three-Dimensional IC Trends", Proceedings of IEEE, vol. 74, No. 12, Dec. 1986, pp. 1703-1714.
Aratani, et al., "Process and Design Considerations for Surface Micromachined Beams for a Tuneable Interferometer Array in Silicon", Proc. IEEE Microelectromechanical Workshop, Fort Lauderdale, FL, Feb. 7-10, pp. 230, 1993.
Goossen et al., "Possible Display Applications of the Silicon Mechanical Anti-Reflection Switch", Society for Information Display, 1994.
Goossen et al., "Silicon Modulator Based on Mechanically-Active Anti-Reflection Layer with 1Mbit/sec Capability for Fiber-in-the-Loop Applications", IEEE Photonic Technology Letters, Sep. 1994.
Gosch, "West Germany Grabs the Lead in X-Ray Lithography", Electronics, Feb. 5, 1987, pp. 78-80.
Howard, "Nanometer-Scale Fabrication Techniques", VLSI Electronics: Microstructure Science, vol. 5, 1982, pp. 145-153, pp. 166-173.
Jackson, "Classical Electrodynamics", John Wiley & Sons Inc., pp. 568-573. 1962.
Jerman et al., "A Miniature Fabry-Perot Interferometer with a Corrugated Silicon Diaphragm Support", Sensors and Actuators A, vol. 29, pp. 151, 1991.
Johnson, "Optical Scanners", Microwave Scanning Antennas, vol. 1, p. 251 et seq. 1964.
"Light Over Matters", Jun. 1993, Circle No. 36.
Newsbreaks, "Quantum-trench devices might operate at terahertz frequencies", Laser Focus World May 1993.
Stone, "Radiation and Optics, An Introduction to the Classical Theory", McGraw-Hill, pp. 340-343, 1963.
Winton, John M., "A novel way to capture solar energy", Chemical Week, May 15, 1985.
Notice of Allowance in U.S. Appl. No. 08/688,710 (Issued as 6,040,637), dated Sep. 23, 1999.
Response to 312 Amendment (PTO-271) in U.S. Appl. No. 08/688,710 (Issued as 6,040,637), dated Jun. 17, 1999.
Preliminary Amendment in U.S. Appl. No. 08/688,710 (Issued as 6,040,637), dated Jun. 9, 1999.
Amendment after Notice of Allowance (Rule 312) in U.S. Appl. No. 08/688,710 (Issued as 6,040,637), dated Jun. 2, 1999.
Notice of Allowance in U.S. Appl. No. 08/688,710 (Issued as 6,040,637), dated Mar. 5, 1999.
Response after Non-Final Action in U.S. Appl. No. 08/688,710 (Issued as 6,040,637), dated Dec. 23, 1998.
Non-Final Rejection in U.S. Appl. No. 08/688,710 (Issued as 6,040,637), dated Jun. 25, 1998.
Advisory Action in U.S. Appl. No. 08/688,710 (Issued as 6,040,637), dated Apr. 7, 1998.
Notice of Appeal from the Examiner to the Board of Patents Appeals and Interferences in U.S. Appl. No. 08/688,710 (Issued as 6,040,637), dated Mar. 16, 1998.
Amendment after Final Rejection in U.S. Appl. No. 08/688,710 (Issued as 6,040,637), dated Dec. 19, 1997.
Final Rejection in U.S. Appl. No. 08/688,710 (Issued as 6,040,637), dated Sep. 16, 1997.
Response after Non-Final Action in U.S. Appl. No. 08/688,710 (Issued as 6,040,637), dated Jun. 2, 1997.
Non-Final Rejection in U.S. Appl. No. 08/688,710 (Issued as 6,040,637), dated Dec. 2, 1996.
Notice of Allowance and Issue Fee Due in U.S. Appl. No. 09/238,340 (Issued as 6,055,090), dated Oct. 14, 1999.
Examiner's Amendment Communication in U.S. Appl. No. 09/238,340 (Issued as 6,055,090), dated Sep. 28, 1999.
Response to Amendment under Rule 312 in U.S. Appl. No. 09/238,340 (Issued as 6,055,090), dated Jun. 17, 1999.
Preliminary Amendment in U.S. Appl. No. 09/238,340 (Issued as 6,055,090), dated Jun. 9, 1999.
Amendment after Notice of Allowance (Rule 312) in U.S. Appl. No. 09/238,340 (Issued as 6,055,090), dated Jun. 2, 1999.
Notice of Allowance in U.S. Appl. No. 09/238,340 (Issued as 6,055,090), dated May 19, 1999.
Official Communication in Taiwanese Application No. 094103300, dated Mar. 26, 2010.
Examiner Interview Summary in U.S. Appl. No. 12/034,499, dated Jun. 9, 2010.
Request for Continued Examination and Amendment in U.S. Appl. No. 12/034,499, dated Jul. 1, 2010.
Notice of Allowance in U.S. Appl. No. 12/034,499, dated Sep. 3, 2010.
Office Action in U.S. Appl. No. 12/014,657, dated May 28, 2010.
Request for Continued Examination and Amendment in U.S. Appl. No. 12/014,657, dated Aug. 30, 2010.
Amendment and Issue Fee Payment in U.S. Appl. No. 11/192,436 mailed Oct. 24, 2008.
Response to Amendment Under Rule 312 Communication in U.S. Appl. No. 11/192,436 mailed Nov. 4, 2008.
Request for Continued Examination and IDS in U.S. Appl. No. 11/742,271 mailed Jul. 21, 2009.
Notice of Allowance in U.S. Appl. No. 11/742,271 mailed Aug. 12, 2009.
Request for Continued Examination and IDS in U.S. Appl. No. 11/742,271 mailed Nov. 11, 2009.
Notice of Allowance in U.S. Appl. No. 11/742,271 mailed Jan. 29, 2010.
Request for Continued Examination, Petition to Withdraw from Issue, and Information Disclosure Statement in U.S. Appl. No. 11/742,271 mailed Jun. 14, 2010.
Decision Granting Petition Under 37 CFR 1.313(c)(2) and Notice of Withdrawal from Issue in U.S. Appl. No. 11/742,271 mailed Jun. 14, 2010.
Office Action in U.S. Appl. No. 11/742,271 mailed Aug. 24, 2010.
Application as filed in U.S. Appl. No. 12/815,136, Jun. 14, 2010.
Request for Continued Examination and Amendment in U.S. Appl. No. 11/432,724, dated Aug. 31, 2009.
Office Action in U.S. Appl. No. 11/432,724, dated Sep. 14, 2009.
Response to Office Action in U.S. Appl. No. 11/432,724, dated Dec. 14, 2009.
Notice of Allowance in U.S. Appl. No. 11/432,724, dated Mar. 26, 2010.
Applicant Summary of Interview with Examiner in U.S. Appl. No. 11/432,724, dated Apr. 26, 2010.
Request for Continued Examination, Amendment, and Information Disclosure Statement in U.S. Appl. No. 11/732,724, dated Jun. 28, 2010.
Notice of Allowance in U.S. Appl. No. 11/432,724, dated Aug. 3, 2010.
Office Action in U.S. Appl. No. 11/626,792, dated Apr. 1, 2010.
Abileah A., "Optical Tiled AMLCD for very large display applications," SID International Symposium Digest of Papers, Boston, pp. 945-949, May 17, 1992.
Mehregany, et. al., "MEMS applications in Optical Systems," IEEE/LEOS 1996 Summer Topical Meetings, pp. 75-76, Aug. 1996.
Miles, M.W., "A MEMS Based Interferometric Modulator (IMOD) for Display Applications," Proceedings of Sensors Expo, pp. 281-284, Oct. 21, 1997.

* cited by examiner

METHOD AND DEVICE FOR MODULATING LIGHT WITH OPTICAL COMPENSATION

CROSS-REFERENCE TO RELATED APPLICATIONS

This application is a continuation of U.S. patent application Ser. No. 11/056,571, filed Feb. 11, 2005, now U.S. Pat. No. 7,379,227 which is a continuation of U.S. patent application Ser. No. 09/966,843, filed Sep. 28, 2001 (now U.S. Pat. No. 6,867,896), which is a divisional of U.S. patent application Ser. No. 09/056,975, filed Apr. 8, 1998 (now U.S. Pat. No. 6,674,562), which is a continuation-in-part of both (1) U.S. patent application Ser. No. 08/769,947, filed Dec. 19, 1996 (now abandoned) and (2) U.S. patent application Ser. No. 08/554,630, filed Nov. 6, 1995 (now abandoned). The disclosures of these prior applications are considered part of, and are incorporated by reference into, the disclosure of this application. Also incorporated by reference herein is U.S. patent application Ser. No. 08/238,750, filed May 5, 1994 (now U.S. Pat. No. 5,835,255).

BACKGROUND

This invention relates to visible spectrum (including ultraviolet and infrared) modulator arrays.

The parent application describes two kinds of structures whose impedance, the reciprocal of admittance, can be actively modified so that they can modulate light. One scheme is a deformable cavity whose optical properties can be altered by electrostatic deformation of one of the cavity walls. The composition and thickness of these walls, which consist of layers of dielectric, semiconductor, or metallic films, allows for a variety of modulator designs exhibiting different optical responses to applied voltages.

One such design includes a filter described as a hybrid filter which has a narrow bandpass filter and an induced absorber. When the wall associated with the hybrid filter is brought into contact with a reflector, incident light of a certain range is absorbed. This occurs because the induced absorber matches the impedance of the reflector to that of the incident medium for the range of frequencies passed by the narrow-band filter.

SUMMARY

In one embodiment, a display device is provided. The display device includes a substrate and a reflector located below the substrate. The device also includes an optical compensation material located above the substrate.

In another embodiment a display device is provided. The display device includes a light-absorbing material. The device further includes a substrate located above the light-absorbing material and a reflector located below the light-absorbing material.

In another embodiment, a display device includes a reflector. The device further includes a light-absorbing material placed between the reflector and a medium from which light is incident. The light-absorbing material is configured to attenuate light incident upon it, and has radiation admittance characteristics that substantially match the admittance of the reflector to the admittance of the medium.

In yet another embodiment, a display device configured to display a color image is provided. The display device includes patterns of image elements. The elements of each of the patterns include interferometric cavities sharing a common fixed cavity thickness that defines a color associated with the pattern. The patterns are together configured to produce the color image.

In another embodiment, a method of manufacturing a display device is provided. The method includes forming a reflective layer and forming a layer of absorbing material. The method further includes providing a substrate layer. The layer of absorbing material is located between the substrate layer and the reflective layer.

In still another embodiment a method of manufacturing a display device is provided. The method includes forming a reflective layer and providing a substrate layer. The method further includes forming an optical compensation layer. The substrate layer is located between the optical compensation layer and the reflective layer.

In still another embodiment, a display device comprising a reflector, a medium from which light is incident and a light absorbing material located between the reflector and the medium is provided. The reflector is configurable in a first position such that the light absorbing material substantially matches the admittance of the reflector to the admittance of the medium. The reflector is further configurable in a second position such that the light absorbing material does not match the admittance of the reflector to the admittance of the medium.

DESCRIPTION

Any thin film, medium, or substrate (which can be considered a thick film) can be defined in terms of a characteristic optical admittance. By considering only the reflectance, the operation of a thin film can be studied by treating it as an admittance transformer. That is, a thin film or combination of thin films (the transformer) can alter the characteristic admittance of another thin film or substrate (the transformed film) upon which it is deposited. In this fashion a normally reflective film or substrate may have its characteristic admittance altered (i.e. transformed) in such a way that its reflectivity is enhanced and/or degraded by the deposition of, or contact with, a transformer. In general there is always reflection at the interface between any combination of films, mediums, or substrates. The closer the admittances of the two, the lower the reflectance at the interface, to the point where the reflectance is zero when the admittances are matched.

Figure 1:
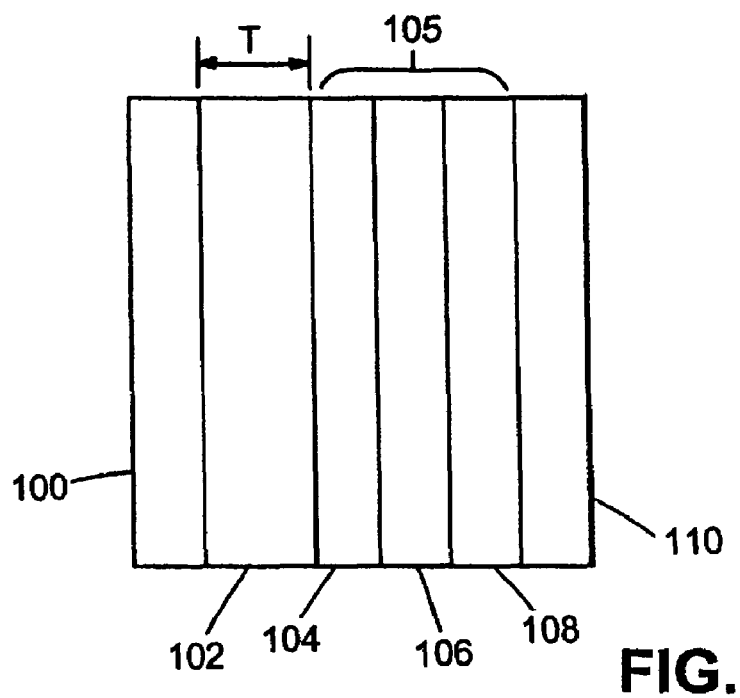
FIG. 1 is a diagram of layers a modulator.

Referring to FIG. 1, reflector 100 (the transformed film) is separated from induced absorber 105 (the transformer), comprising films 104, 106, and 108, by variable thickness spacer 102. Incident medium 110 bounds the other side of induced absorber 105. Each of these thin films is micromachined in a fashion described in the parent patent application. Induced absorber 105 performs two functions. The first is to match the admittances of reflector 100 and incident medium 110. This is accomplished via matching layer 108, which is used to transform the admittance of absorber 106 to that of the incident medium 110, and via matching layer 104, which is used to transform the admittance of reflector 100 to that of absorber 106. The second function is the absorption of light. This is accomplished using absorber 106, which performs the function of attenuating light which is incident upon it through the medium, as well as light which is incident upon it from the reflector.

Figure 2:
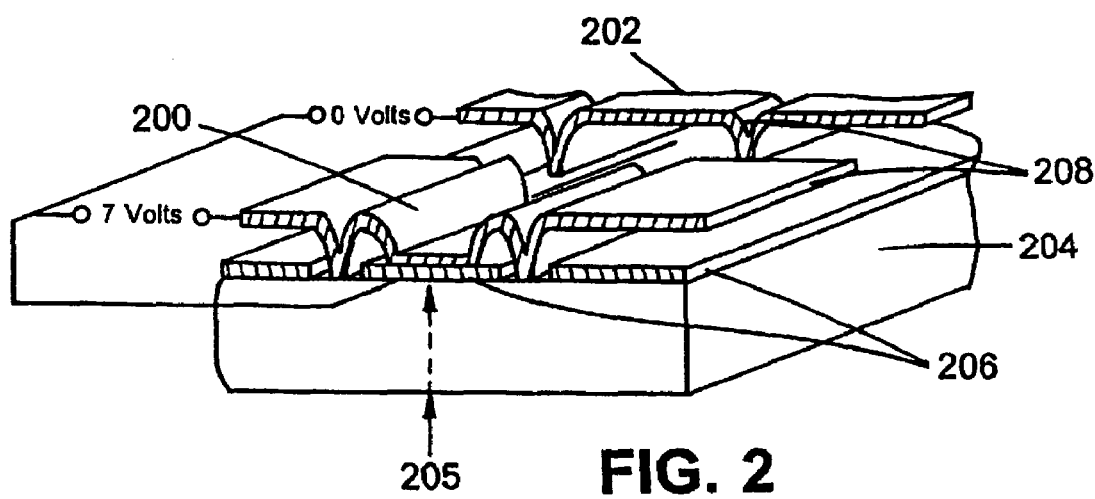
FIG. 2 is a perspective view of cavities in a device.

The ability to alter the thickness T of spacer 102 allows the optical characteristics of the entire structure to be modified. Referring to FIG. 2, pixel 200 is shown in the driven state and pixel 202 in the undriven state. In this case induced absorber 206 (the transformer) resides on substrate 204 and reflector 208 (the transformed film) is a self-supporting structure. Application of a voltage causes reflector 208 to come into contact or close proximity with induced absorber 206. Proper selection of materials and thicknesses will result in a complete transformation of the admittance of reflector 208 to that of substrate 204. Consequently, a range of frequencies of light 205, which is incident through substrate 204, will be significantly absorbed by the pixel. With no voltage applied, reflector 208 returns to its normal structural state which changes the relative admittances of the reflector and the substrate. In this state (pixel 202) the cavity behaves more like a resonant reflector, strongly reflecting certain frequencies while strongly absorbing others.

Figure 3:
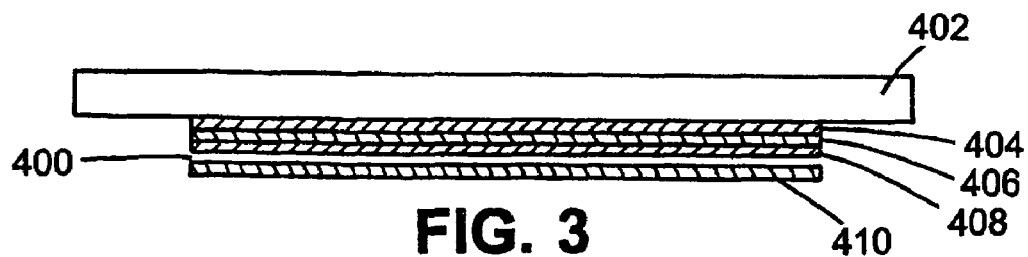
FIG. 3 is a diagram is a side view of a pixel device.
Figure 4:
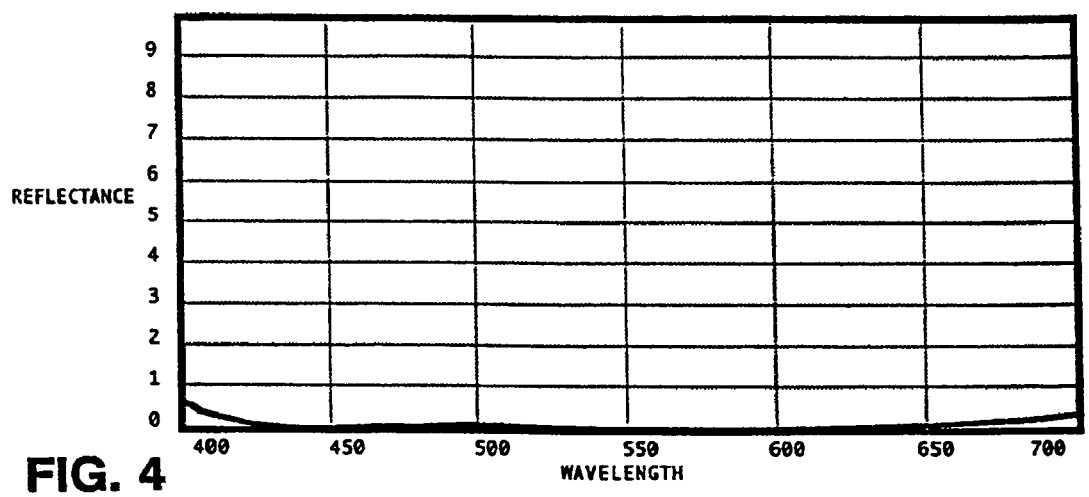
FIG. 4 is a graph of the optical response for a cavity which appears black.
Figure 5:
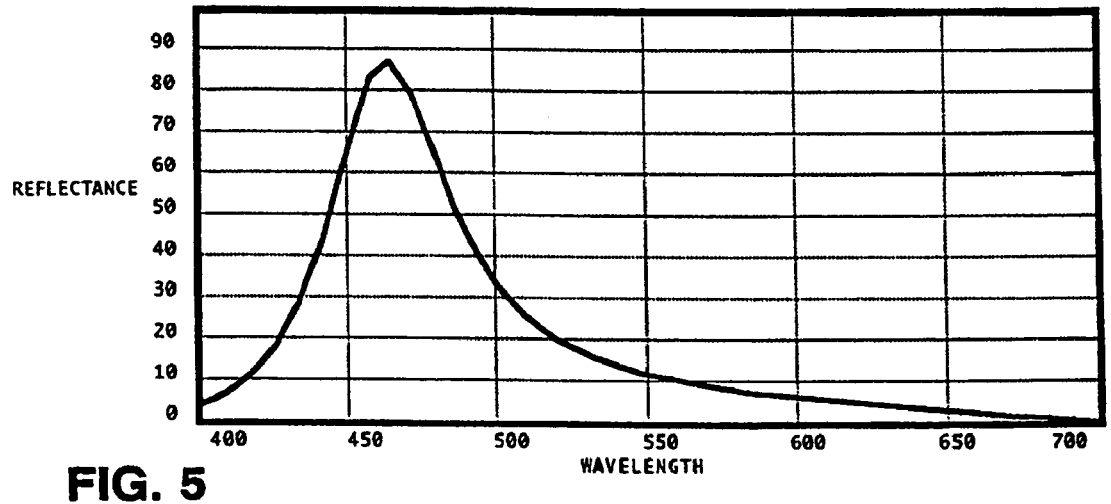
FIG. 5 is a graph of the optical response for a cavity which appears blue.
Figure 6:
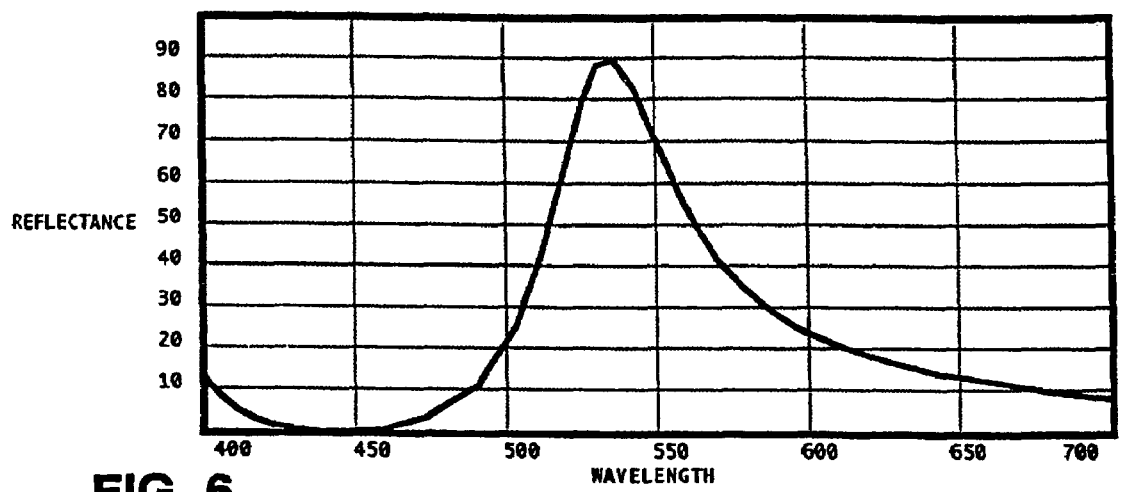
FIG. 6 is a graph of the optical response for a cavity which appears green.
Figure 7:
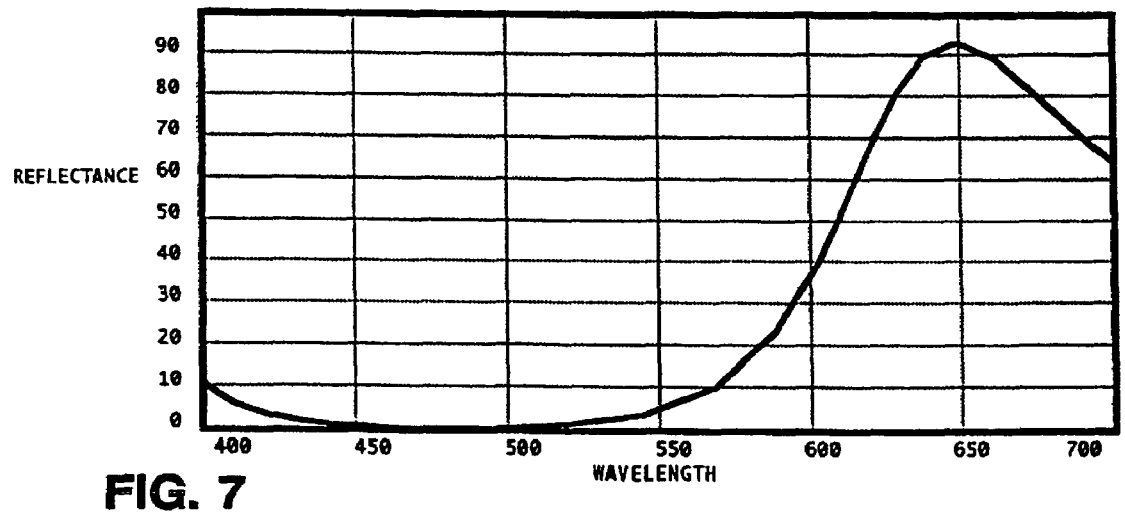
FIG. 7 is a graph of the optical response for a cavity which appears red.
Figure 8:
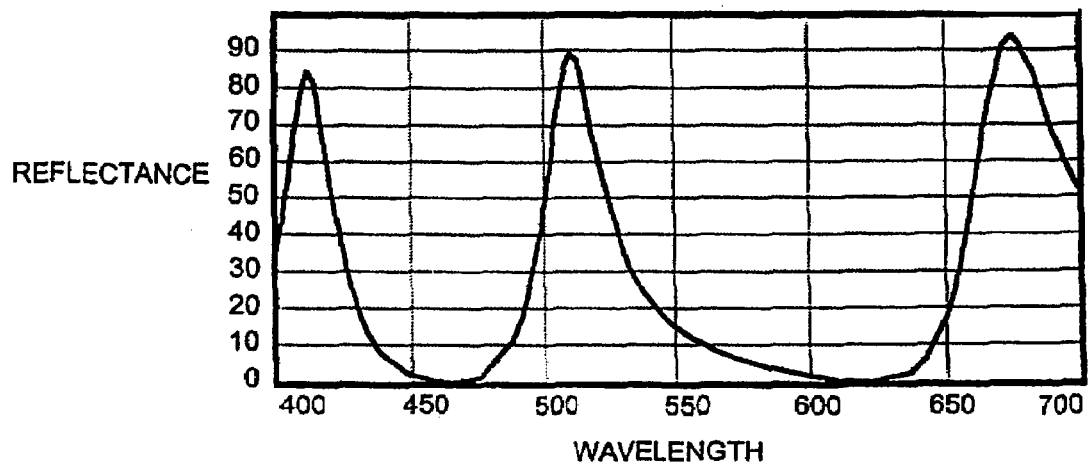
FIG. 8 is a graph of the optical response for a cavity which appears white.
Figure 9:
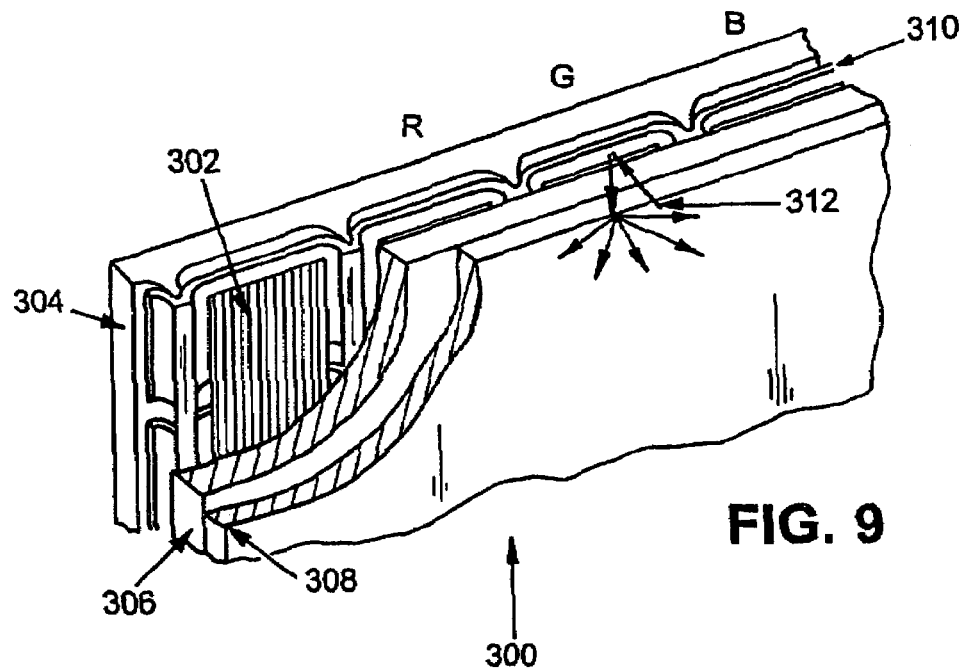
FIG. 9 is a perspective view of a fragment of a reflective flat panel display.

Proper selection of materials thus allows for the fabrication of pixels which can switch from reflecting any color (or combination of colors) to absorbing (e.g., blue to black), or from reflecting any color combination to any other color (e.g., white to red). Referring to FIG. 3, in a specific pixel design, substrate 402 is glass, matching layer 404 is a film of zirconium dioxide which is 54.46 nm thick, absorber 406 is a tungsten film 14.49 nm thick, matching layer 408 is a film of silicon dioxide 50 nm thick, spacer 400 is air, and reflector 410 is a film of silver at least 50 nm thick. Referring to FIG. 4, the optical response of the pixel is shown in the driven state, i.e., when reflector 410 is in contact with matching layer 408 resulting in a broad state of induced absorption. Referring to FIGS. 5-8, the different color pixels are shown in respective undriven states which correspond to the reflection of blue, green, red, and white light, respectively. These responses correspond to undriven spacer thicknesses of 325, 435, 230, and 700 nm respectively Referring to FIG. 9, a section of a full color reflective flat panel display 298 includes three kinds of pixels, R, G, and B. Each kind differs from the others only in the size of the undriven spacer which is determined during manufacture as described in the parent patent application. Induced absorber 300 resides on substrate 304, and reflector 308 is self-supporting. Monolithic backplate 302 provides a hermetic seal and can consist a thick organic or inorganic film. Alternatively, the backplate may consist of a separate piece, such as glass, which has been aligned and bonded to the substrate. Electrodes may reside on this backplate so that the electromechanical performance of the pixels may be modified. Incident light 310 is transmitted through optical compensation mechanism 306 and substrate 304 where it is selectively reflected or absorbed by a pixel. The display may be controlled and driven by circuitry of the kind described in the parent application.

Optical compensation mechanism 306 serves two functions in this display. The first is that of mitigating or eliminating the shift in reflected color with respect to the angle of incidence. This is a characteristic of all interference films and can be compensated for by using films with specifically tailored refractive indices or holographic properties, as well as films containing micro-optics; other ways may also be possible. The second function is to supply a supplemental frontlighting source. In this way, additional light can be added to the front of the display when ambient lighting conditions have significantly diminished thus allowing the display to perform in conditions ranging from intense brightness to total darkness. Such a frontlight could be fabricated using patterned organic emitters or edge lighting source coupled to a micro-optic array within the optical compensation film; other ways may also be possible.

The general process for fabrication of the devices is set forth in the parent application. Additional details of two alternative ways to fabricate spacers with different sizes are as follows; other ways may also be possible.

Both alternative processes involve the iterative deposition and patterning of a sacrificial spacer material which, in the final step of the larger process is, etched away to form an air-gap.

Figure 10A:
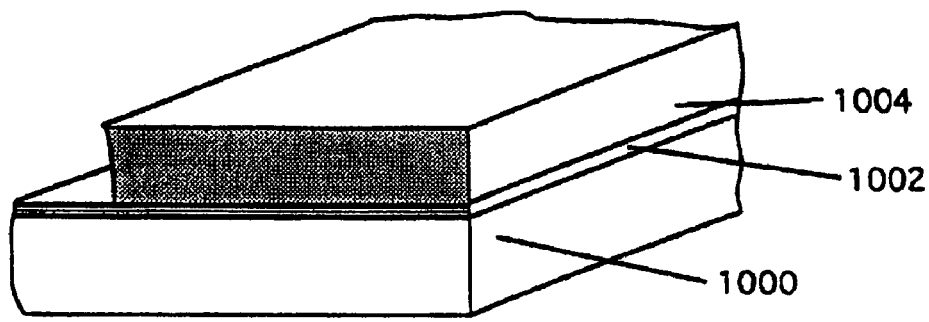
FIGS. 10a, 10b, 10c, 10d are perspective views of different spacers during fabrication.
Figure 10B:
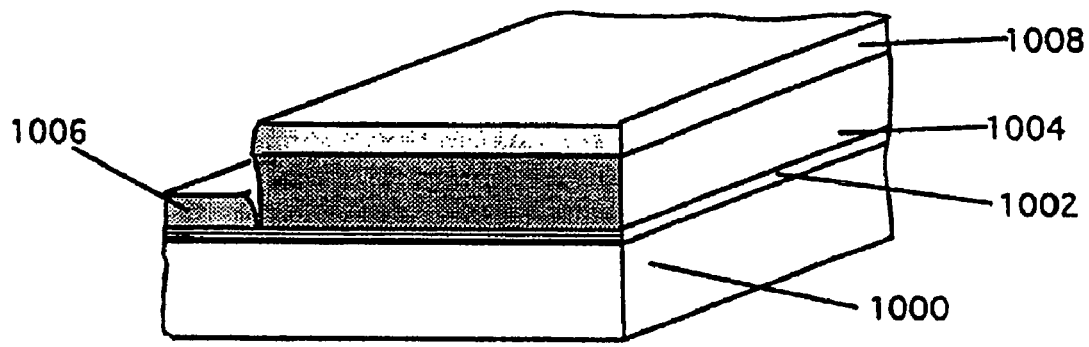
Figure 10C:
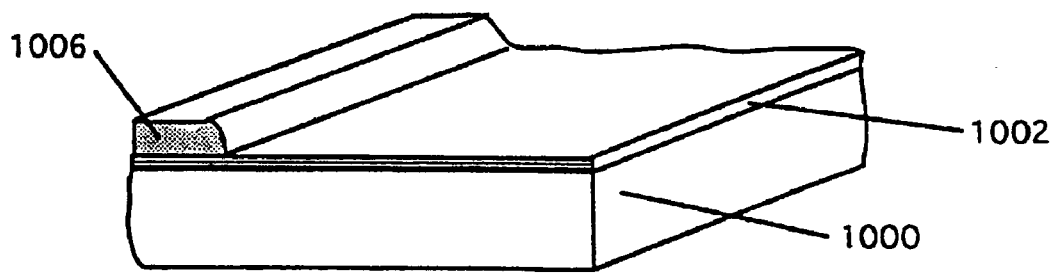
Figure 10D:
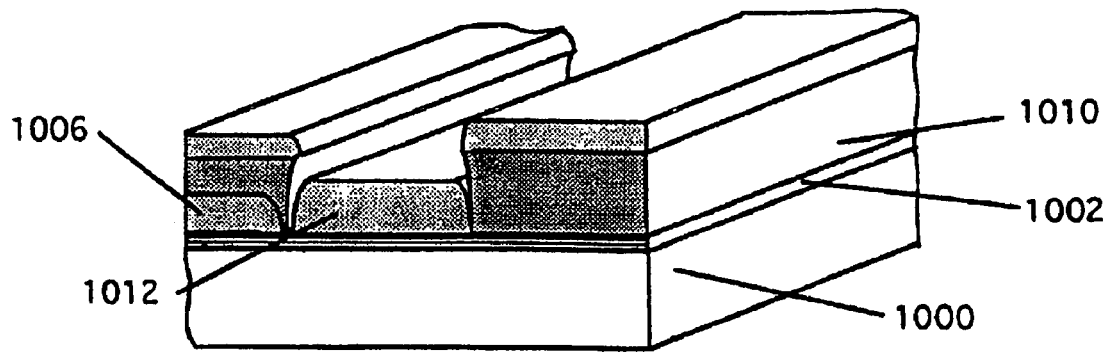

Referring to FIG. 10a, substrate 1000 is shown with induced absorber 1002 already deposited and photoresist 1004 deposited and patterned. Induced absorber 1002 is deposited using any number of techniques for thin film deposition including sputtering and e-beam deposition. The photoresist is deposited via spinning, and patterned by overexposure to produce a natural overhang resulting in a stencil. The result is that it may be used to pattern subsequently deposited materials using a procedure known as lift-off. Referring to FIG. 10b, spacer material 1006 has been deposited, resulting in excess spacer material 1008 on top of the stencil. Referring to FIG. 10c, the stencil along with the excess spacer material have been lifted off by immersing the device in a bath of a solvent such as acetone and agitating it with ultrasound. Referring to FIG. 10d, the process has begun again with new photoresist 1010 having been deposited patterned in a fashion such that new spacer 1012 is deposited adjacent to the old spacer 1006. Repeating the process once more results in spacers with three different thicknesses. Referring to FIG. 10d, the process has begun again with new photoresist 1010 having been deposited patterned in a fashion such that new spacer 1012, with a different thickness, is deposited adjacent to the old spacer 1006.

Figure 11A:
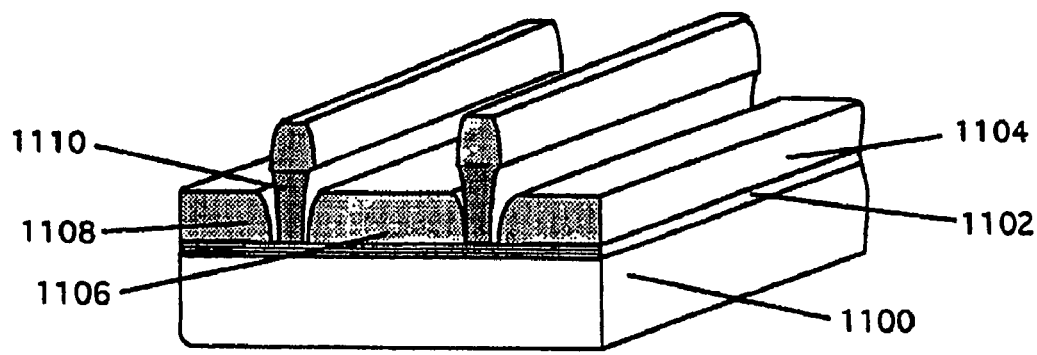
FIGS. 11a, 11b, 11c, 11d are also perspective views of different spacers during fabrication.
Figure 11B:
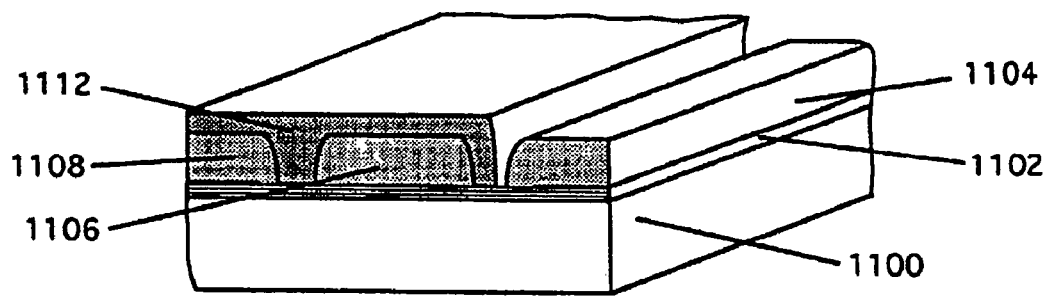
Figure 11C:
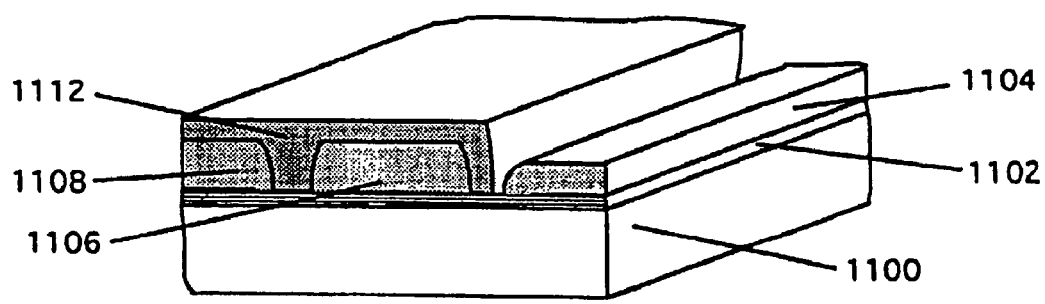
Figure 11D:
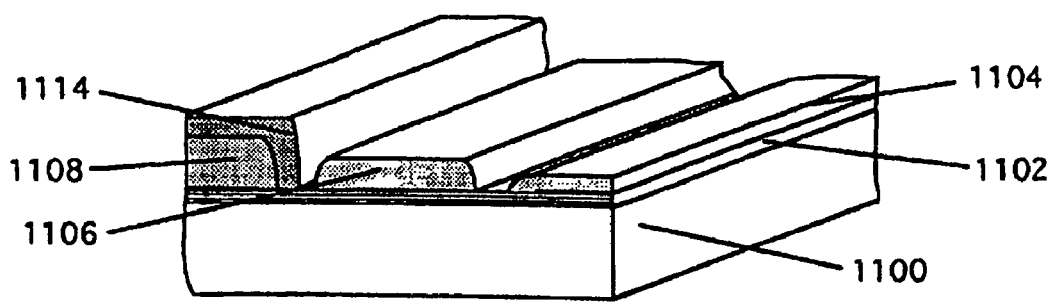

Referring to FIG. 11a, substrate 1000 is shown with induced absorber 1102 already deposited. Spacer materials 1104, 1106, and 1108 have also been deposited and patterned by virtue of lift-off stencil 1110. The spacer materials have a thickness corresponding to the maximum of the three thicknesses required for the pixels. Referring to FIG. 11b, the stencil along with the excess material has been lifted off and new photoresist 1112 has been deposited and patterned such that spacer 1104 has been left exposed. Referring to FIG. 11c, spacer material 1104 has been etched back via one of a number of techniques which include wet chemical etching, and reactive ion etching. Only a portion of the required spacer material is etched away, with the remainder to be etched in a subsequent etch step. Photoresist 1112 is subsequently removed using a similar technique. Referring to FIG. 11d, new photoresist 1114 has been deposited and patterned exposing spacers 1104 and 1106. The entire etch of spacer 1106 is performed in this step, and the etch of spacer 1104 is completed. Photoresist 1114 is subsequently removed and the process is complete.

Other embodiments are within the scope of the following claims.

For example, the spacer material need not ultimately be etched away but may remain instead a part of the finished device. In this fashion, and using the previously described patterning techniques, arbitrary patterns may be fabricated instead of arrays of simple pixels. Full color static graphical images may thus be rendered in a method which is analogous to a conventional printing process. In conventional printing, an image is broken up into color separations which are basically monochrome graphical subsets of the image, which correspond to the different colors represented, i.e., a red separation, a blue separation, a green separation, and a black separation. The full-color image is produced by printing each separation using a different colored ink on the same area.

Alternatively, in a process which we will call "Iridescent Printing", the different separations are composed of layers of thin films which correspond to the IMod design described here and those in the referenced patent. Patterning or printing a combination of colors or separations on the same area, allows for brilliant full-color images to be produced.

Figure 12A:
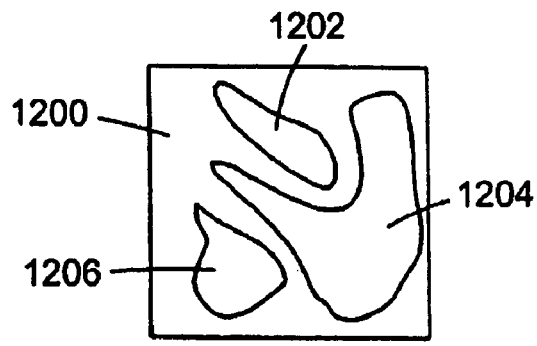
FIGS. 12a, 12b, 12c, 12d are top views of a static graphic image.
Figure 12B:
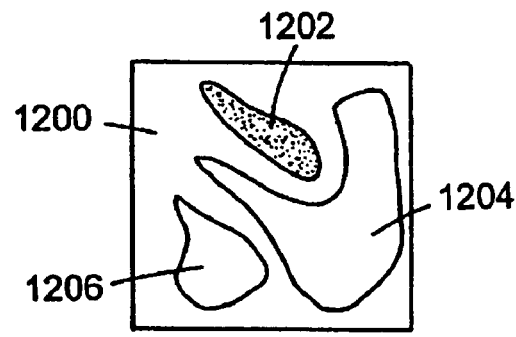
Figure 12C:
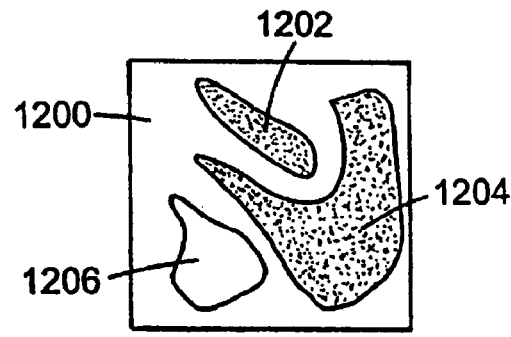
Figure 12D:
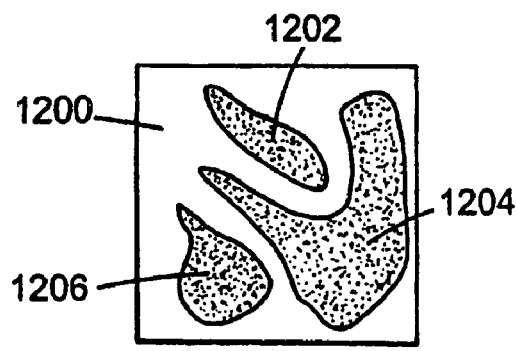

Referring to FIG. 12*a*, a square substrate is shown with area 1200 representing the portion of the substrate which has been patterned with a thin film stack optimized for black. Referring to FIG. 12*b*, the substrate has been subsequently patterned with a thin film stack optimized for red in area 1202. Referring to FIG. 12*c*, the substrate has been subsequently patterned with a thin film stack optimized for green in area 1204. Referring to FIG. 12*d*, the substrate has been subsequently patterned with a thin film stack optimized for blue in area 1206.

Alternatively, a simpler process can be obtained if only the induced absorber design is used. In this process, the entire substrate is first coated with the induced absorber stack. Subsequent steps are then used to pattern the spacer material only, using the aforementioned techniques. After the desired spacers, i.e., colors are defined, a final deposition of a reflector is performed.

The brightness of different colors can be altered by varying the amount of black interspersed with the particular color i.e. spatial dithering. The images also exhibit the pleasing shift of color with respect to viewing angle known as iridescence.

In another example, a reflective flat panel display may also be fabricated using a single kind of pixel instead of three. Multiple colors, in this case, are obtained through fabricating the pixels in the form of continuously tunable or analog interferometric modulators as described in the parent patent application. In this fashion, any individual pixel may, by the application of the appropriate voltage, be tuned to reflect any specific color. This would require that the array be fabricated on a substrate along with electronic circuitry, or directly on the surface of an integrated circuit, in order to provide a charge storage mechanism. This approach, though it requires a more complicated driving scheme relying on analog voltages, provides superior resolution. It would also find application in a projection system.

Figure 13:
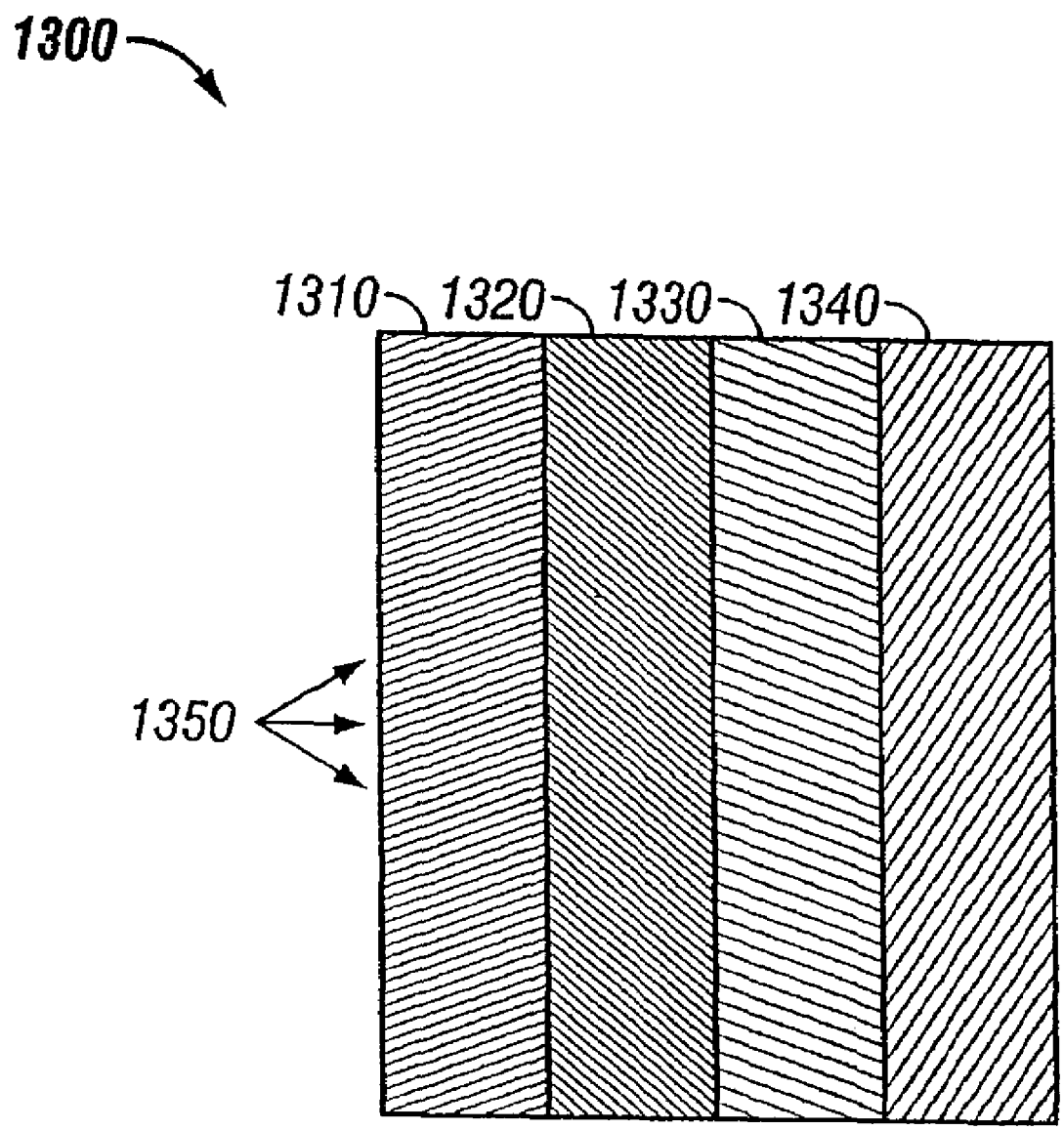
FIG. 13 is a diagram of an exemplary embodiment of a layered display device comprising an optical compensation mechanism and an induced absorber.

Referring to FIG. 13, a diagram of an exemplary display 1300 is illustrated. As shown in this embodiment, the display 1300 comprises a plurality of stacked layers. The display 1300 comprises first layer comprising an optical compensation material or mechanism 1310 located in a front portion of the display 1300. Next to the first layer, a second layer comprising a substrate 1320 (also referred to as an incident medium in some embodiments) is located. Next to the second layer, a third layer comprising an induced absorber 1330 is located. Next to the third layer, a fourth layer comprising a reflector 1340 is located.

The induced absorber 1330 may include a sandwich of an absorber between two matching layers. One of the matching layers may reside at the boundary of the absorber 1330 with the substrate 1320 and the other matching layer may reside at the boundary of the absorber 1330 with the reflector 1340.

The substrate 1320 may also include a transparent incident medium. The induced absorber 1330 and/or the reflector 1340 may reside on the substrate 1320. The substrate 1320 may be transparent, in which case it could also act as the incident medium, or opaque.

The display 1300 may be used in a projection system. An optical compensation mechanism 1310 may be used to mitigate or eliminate a shift in color with respect to viewing angle or to provide supplemental frontlighting or to mitigate or eliminate a shift in color with respect to viewing angle. The substrate 1320 may be an integrated circuit.

In this embodiment, incident light 1350 enters a front portion of the display 1300 and at least a portion of the light 1350 passes through the optical compensation mechanism 1310. After the incident light 1350 passes through the optical compensation mechanism 1310, at least a portion of the light 1350 passes through the substrate 1320. After passing through the substrate 1320, at least a portion of the light 1350 passes through an induced absorber 1330. Accordingly, after the light 1350 passes through the induced absorber 1330, at least a portion of the light 1350 continues on to the reflector 1340. Some of the light 1350 may be reflected by the reflector 1340 and then travel back through the induced absorber 1330, then the substrate 1320, and then the optical compensation mechanism 1310.

Although the embodiment illustrated in FIG. 13 depicts certain elements in a particular configuration, many other configurations are possible that are still within the scope of the invention. For example, in some embodiments the substrate 1320 may not serve as an incident medium. Moreover, other embodiments may not require all of the elements depicted in FIG. 13. For example, in some embodiments, the optical compensation mechanism 1310 or the induced absorber 1330 may not be present.

The invention claimed is:

1. A display device comprising:
   a substrate;
   a reflector located below said substrate, wherein the reflector is configured to be movable to provide modulation; and
   an optical compensation material located above said substrate,
   wherein the optical compensation material is configured to mitigate or eliminate a shift in color with respect to viewing angle, and
   wherein the optical compensation material comprises at least one film selected from a group consisting of: a film with holographic properties and a film with micro-optics.

2. The display device of claim 1, wherein the reflector is a portion of an interferometric modulator.

3. A display device comprising:
   a substrate;
   a reflector located below said substrate, wherein the reflector is configured to be movable to provide modulation; and an optical compensation material located above said substrate,
wherein the optical compensation material comprises a light source and is configured to provide supplemental frontlighting.

4. The display device of claim 3, wherein the light source comprises an organic emitter.

5. The display device of claim 3, wherein the reflector is a portion of an interferometric modulator.

6. The display device of claim 3, wherein the supplemental frontlighting comprises micro-optics.

7. The display device of claim 6, wherein the supplemental frontlighting is edge lit.

8. device, comprising:
a light-absorbing material;
a substrate located above said light-absorbing material;
a reflector located below said light-absorbing material, wherein the reflector is configured to be movable to provide modulation;
an optical compensation material located above the substrate;
a conducting layer located between said light absorbing material and said substrate or between said light absorbing material and said reflector; and
a cavity, a portion of which is located between said light absorbing material and said reflector.

9. The device of claim 8, wherein the light-absorbing material is configured to attenuate light incident upon the light-absorbing material from the substrate or the reflector, the amount of attenuation varying with a voltage applied to the conducting layer.

10. The device of claim 8, wherein the light-absorbing material comprises a high loss film.

11. The device of claim 10, wherein the high loss film comprises at least one material from the group consisting of: a metal, a semiconductor, and a combination of a metal and a semiconductor.

12. The device of claim 8, wherein the optical compensation material is configured to mitigate or eliminate a shift in color with respect to viewing angle.

13. The device of claim 8, wherein the optical compensation material is configured to provide supplemental frontlighting.

14. The display device of claim 13, wherein the optical compensation material providing supplemental frontlighting comprises micro-optics.

15. The display device of claim 13, wherein the optical compensation material providing supplemental frontlighting comprises an edge lighting source.

16. The device of claim 8, wherein the cavity comprises at least one layer selected from the group consisting of: a metal layer, a dielectric layer, a semiconducting layer and an air gap.

17. The device of claim 8, wherein the reflector is a portion of an interferometric modulator.

18. A display device, comprising:
a plurality of display pixels comprising;
a light-absorbing material;
a substrate located above said light-absorbing material; and
a reflector located below said light-absorbing material; and
an optical compensation material located above said substrate,
wherein the optical compensation material comprises at least one layer selected from a group consisting of: a layer with holographic properties, a layer with micro-optics, and a layer with patterned organic emitters,
wherein the reflector is configured to be movable to provide modulation.

19. A device, comprising:
a reflector;
a light-absorbing material placed between the reflector and a medium from which light is incident, the light-absorbing material being configured to attenuate light incident upon it, and having radiation admittance characteristics that substantially match the admittance of the reflector to the admittance of said medium;
a conductor disposed between the light-absorbing material and the medium or between the light-absorbing material and the reflector; and
a cavity having a variable thickness, a portion of said cavity disposed between the reflector and the light-absorbing material.

20. The device of claim 19, wherein the light-absorbing material comprises an absorber disposed between a first layer and a second layer.

21. The device of claim 20, wherein at least one of the first and second layers comprises at least one film selected from the group consisting of: a metal film, a dielectric film, a semiconducting film, and a combination of at least two of a metal film, a dielectric film and a semiconducting film.

22. The device of claim 20, wherein the absorber comprises a film selected from the group consisting of: a metal film, a semiconducting film, and a combination film comprising a metal and a semiconducting material.

23. The device of claim 19, wherein the cavity comprises at least one layer selected from the group consisting of: a metal layer, a dielectric layer, a semiconducting layer and an air gap.

24. A display device, comprising:
a reflector;
a light-absorbing material placed between the reflector and a medium from which light is incident, the light-absorbing material being configured to attenuate light incident upon it, and having radiation admittance characteristics that substantially match the admittance of the reflector to the admittance of said medium; and
an optical compensation material located on the other side of the medium from the reflector, wherein the optical compensation material comprises at least one layer selected from a group consisting of: a layer with holographic properties, a layer with micro-optics, and a layer with patterned organic emitters.

25. The display device of claim 24, wherein the reflector is configured to be movable to provide modulation.

26. A method of manufacturing a device, the method comprising:
forming a reflective layer, the reflector configured to be movable to provide modulation;
forming a layer of absorbing material;
providing a substrate layer;
providing an optical compensation material above the substrate; and
forming a conducting layer between the layer of absorbing material and the substrate layer,
wherein the layer of absorbing material is located between the substrate layer and the reflective layer.

27. The method of claim 26, wherein forming a layer of absorbing material comprises forming an absorber and forming two layers, wherein the absorber is located between the two layers.

28. The method of claim 27, wherein the absorber comprises a metal, a semiconductor or a combination of a metal and a semiconductor, and at least one of the two layers comprises at least one film selected from the group consisting of:

a metal film, a dielectric film, a semiconducting film, and a combination of at least two of a metal film, a dielectric film and a semiconducting film.

29. The method of claim 26, wherein the reflector is a portion of an interferometric modulator.

30. A method of manufacturing a device, the method comprising:
   forming a reflective layer, wherein the reflective layer is configured to be movable to provide modulation;
   providing a substrate layer; and
   providing an optical compensation layer, wherein the substrate layer is located between the optical compensation layer and the reflective layer,
   wherein the optical compensation layer comprises at least one layer selected from a group consisting of: a layer with holographic properties, a layer with micro-optics, and a layer with patterned organic emitters,
   wherein the reflector is a portion of an interferometric modulator.

31. The method of claim 30, further comprising forming a layer of absorbing material, wherein the layer of absorbing material is located between the reflective layer and the substrate layer.

32. The method of claim 31, wherein forming a layer of absorbing material comprises forming an absorber and forming two layers, wherein the absorber is located between the two layers.

33. A device comprising:
   a reflector;
   a medium from which light is incident;
   a light absorbing material located between the reflector and the medium; and
   a conducting layer disposed between said medium and said light absorbing material,
   wherein the reflector is configurable in a first position such that the light absorbing material substantially matches the admittance of the reflector to the admittance of the medium, and wherein the reflector is configurable in a second position such that the light absorbing material does not match the admittance of the reflector to the admittance of the medium.

34. The device of claim 33, wherein the light absorbing material further comprises an absorber layer and a first layer, wherein the absorber layer absorbs light and the first layer at least partially matches the admittance of the reflector to the admittance of the medium.

35. The device of claim 34, wherein the light absorbing material further comprises a second layer that at least partially matches the admittance of the reflector to the admittance of the medium.

36. The device of claim 35, wherein the absorber layer is disposed between the first and second layers.

37. The device of claim 34, wherein the first layer comprises at least one film selected from the group consisting of: a metal film, a dielectric film, a semiconducting film, and a combination of at least two of a metal film, a dielectric film and a semiconducting film.

38. The device of claim 34, wherein the absorber layer comprises a film selected from the group consisting of: a metal film, a semiconducting film, and a combination film comprising a metal and a semiconducting material.

39. The device of claim 33, wherein the reflector is positioned closer to the light absorbing material in the first position than in the second position.

40. The device of claim 33, wherein the display device reflects substantially non-visible light when the reflector is in the first position.

41. A method of manufacturing a display device, the method comprising:
   forming a reflective layer, wherein the reflective layer is configured to be movable to provide modulation;
   providing a substrate layer; and
   providing an optical compensation layer, wherein the substrate layer is located between the optical compensation layer and the reflective layer,
   wherein the optical compensation layer comprises a light source and
   is configured to provide supplemental frontlighting.

42. The method of claim 41, wherein the light source comprises an organic emitter.

43. The method of claim 41, wherein the reflector is a portion of an interferometric modulator.

44. The display device of claim 41, wherein the supplemental frontlighting comprises a micro-optic array.

45. The display device of claim 44, wherein the supplemental frontlighting is edge lit.

* * * * *

UNITED STATES PATENT AND TRADEMARK OFFICE
CERTIFICATE OF CORRECTION

| | | |
|---|---|---|
| PATENT NO. | : 7,907,319 B2 | Page 1 of 1 |
| APPLICATION NO. | : 11/433294 | |
| DATED | : March 15, 2011 | |
| INVENTOR(S) | : Mark W. Miles | |

It is certified that error appears in the above-identified patent and that said Letters Patent is hereby corrected as shown below:

Title Page; item (56);

At page 7, column 2 (Other Publications), line 50, change "11/732,724," to --11/432,724,--.

At Column 1, line 52, after "embodiment" insert --,--.

At Column 2, line 10, after "embodiment" insert --,--.

At Column 2, line 18, after "incident" insert --,--.

At Column 7, line 14, in Claim 8, before "device," insert --A--.

Signed and Sealed this
Thirteenth Day of September, 2011

David J. Kappos
*Director of the United States Patent and Trademark Office*